(12) United States Patent
Eshghi et al.

(10) Patent No.: US 12,432,239 B2
(45) Date of Patent: Sep. 30, 2025

(54) DETECTING ANOMALOUS DOWNLOADS

(71) Applicant: Box, Inc., Redwood City, CA (US)

(72) Inventors: Kave Eshghi, Los Altos, CA (US);
Victor De Vansa Vikramaratne,
Sunnyvale, CA (US)

(73) Assignee: Box, Inc., Redwood City, CA (US)

( * ) Notice: Subject to any disclaimer, the term of this patent is extended or adjusted under 35 U.S.C. 154(b) by 42 days.

(21) Appl. No.: 18/492,714

(22) Filed: Oct. 23, 2023

(65) Prior Publication Data

US 2024/0137379 A1 Apr. 25, 2024
US 2024/0236130 A9 Jul. 11, 2024

Related U.S. Application Data

(63) Continuation of application No. 16/948,779, filed on Sep. 30, 2020, now Pat. No. 11,799,890.
(60) Provisional application No. 62/909,121, filed on Oct. 1, 2019.

(51) Int. Cl.
*H04L 9/40* (2022.01)
*G06N 20/00* (2019.01)
*H04L 67/1097* (2022.01)
*H04L 67/50* (2022.01)

(52) U.S. Cl.
CPC ...... *H04L 63/1425* (2013.01); *H04L 63/1416* (2013.01); *H04L 63/20* (2013.01); *H04L 67/1097* (2013.01); *H04L 67/535* (2022.05); *G06N 20/00* (2019.01)

(58) Field of Classification Search
CPC . H04L 63/1425; H04L 63/1416; H04L 63/20; H04L 67/535

USPC .................................................. 726/22
See application file for complete search history.

(56) References Cited

U.S. PATENT DOCUMENTS

| | | | |
|---|---|---|---|
| 7,176,791 B2 * | 2/2007 | Sakaki | H04L 63/20 380/216 |
| 7,519,860 B2 * | 4/2009 | Hatonen | G06F 18/2433 716/52 |
| 9,210,181 B1 * | 12/2015 | Nandy | H04L 63/1416 |
| 9,798,883 B1 * | 10/2017 | Gil | H04L 63/1433 |
| 10,223,403 B2 * | 3/2019 | Malhotra | G06N 3/044 |
| 10,296,520 B1 * | 5/2019 | Ganesh | G06F 16/11 |
| 2010/0312726 A1 * | 12/2010 | Thompson | G06N 5/022 706/54 |
| 2015/0163224 A1 * | 6/2015 | Kim | H04L 67/56 726/27 |
| 2016/0261465 A1 * | 9/2016 | Gupta | H04L 43/08 |
| 2017/0195353 A1 * | 7/2017 | Taylor | H04L 69/22 |
| 2018/0234442 A1 * | 8/2018 | Luo | G06N 7/01 |
| 2019/0260795 A1 * | 8/2019 | Araiza | G06V 30/10 |

(Continued)

OTHER PUBLICATIONS

Non-Final Office Action for U.S. Appl. No. 16/115,069 dated May 19, 2020.

(Continued)

*Primary Examiner* — Bardi Narayanan Champakesan
(74) *Attorney, Agent, or Firm* — Vista IP Law Group, LLP

(57) ABSTRACT

Disclosed is an improved systems, methods, and computer program products that performs user behavior analysis to identify malicious behavior in a computing system. The approach may be implemented by generating feature vectors for two time periods, performing scoring, and then performing anomaly detection.

17 Claims, 26 Drawing Sheets

(56) References Cited

U.S. PATENT DOCUMENTS

2019/0325514 A1* 10/2019 Hong ............... G06Q 40/03
2020/0285737 A1* 9/2020 Kraus ............... G06F 21/552

OTHER PUBLICATIONS

Final Office Action for U.S. Appl. No. 16/115,069 dated Sep. 8, 2020.
Notice of Allowance for U.S. Appl. No. 16/115,069 dated Jan. 19, 2021.
Beutel, Alex, Leman Akoglu, and Christos Faloutsos. "Graph-based user behavior modeling: from prediction to fraud detection." Proceedings of the 21th ACM SIGKDD international conference on knowledge discovery and data mining. 2015.
Beutel, Alex. "User behavior modeling with large-scale graph analysis." Computer Science Department, Carnegie Mellon University (2016).
Zhang, Wei, et al. "Network-based machine learning and graph theory algorithms for precision oncology." NPJ precision oncology 1.1 (2017): 1-15.
Almeida, Aitor, and Gorka Azkune. "Predicting human behaviour with recurrent neural networks." Applied Sciences 8.2 (2018): 305.
Schneible, Joe. "The Intersection of Large-Scale Graph Analytics and Deep Learning", URL:https://devblogs.nvidia.com/intersection-large-scale-graph-analytics-deep-learning/, Sep. 26, 2016.
Pan, Shimei, and Tao Ding. "Automatically Infer Human Traits and Behavior from Social Media Data." arXiv preprint arXiv:1804.04191 (2018).
Aasman, Jans. "Solidifying security analytics with artificial intelligence knowledge graphs", URL:https://www.infoworld.com/article/3269728/solidifying-security-analytics-with-artificial-intelligence-knowledge-graphs.html, May 4, 2018.
Schindler, Timo. "Anomaly detection in log data using graph databases and machine learning to defend advanced persistent threats." arXiv preprint arXiv:1802.00259 (2018).
Wang, Gang, et al. "Clickstream user behavior models." ACM Transactions on the Web (TWEB) 11.4 (2017): 1-37.
Augustyniak, Piotr, and Grażyna Ślusarczyk. "Graph-based representation of behavior in detection and prediction of daily living activities." Computers in biology and medicine 95 (2018): 261-270.
Non-Final Office Action for U.S. Appl. No. 17/322,360 dated Feb. 21, 2023.
Non-Final Office Action for U.S. Appl. No. 16/948,779 dated Nov. 2, 2022.
Final Office Action for U.S. Appl. No. 16/948,779 dated Feb. 21, 2023.
Notice of Allowance dated Jun. 12, 2023 for U.S. Appl. No. 17/322,360.
Notice of Allowance for U.S. Appl. No. 16/948,779 dated Jun. 16, 2023.
Non-Final Office Action for U.S. Appl. No. 18/492,727 dated Sep. 10, 2024.
Notice of Allowance for U.S. Appl. No. 18/492,727 dated Jan. 16, 2025.

* cited by examiner

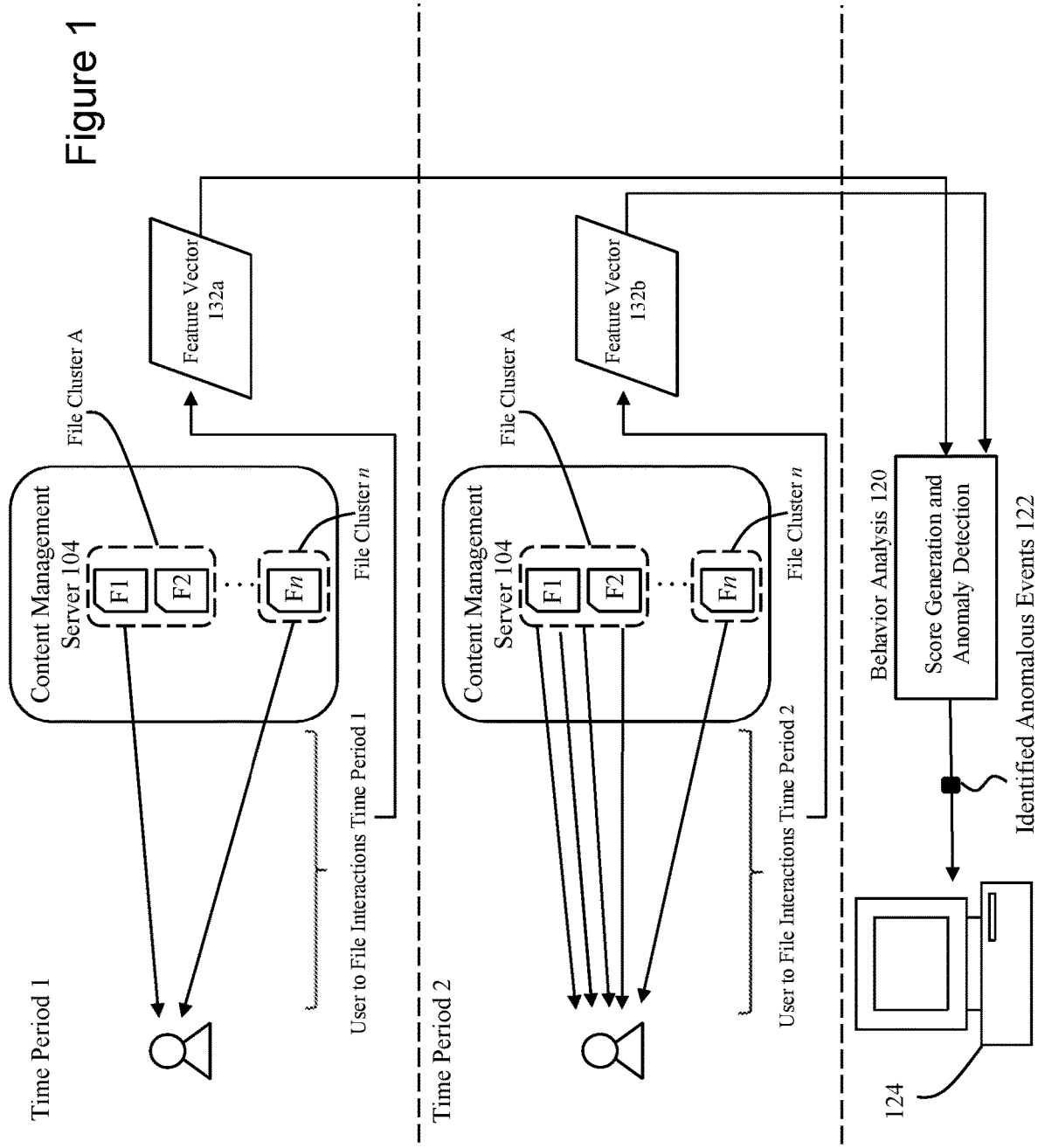

DETECTING ANOMALOUS DOWNLOADS

CROSS-REFERENCE TO RELATED APPLICATIONS

The present application is a continuation of U.S. patent application Ser. No. 16/948,779, filed on Sep. 30, 2020, which claims the benefit of priority to U.S. Provisional Application No. 62/909,121, filed on Oct. 1, 2019, which are hereby incorporated by reference in their entirety.

BACKGROUND

The proliferation of cloud-based services and platforms continues to increase. Specifically, cloud-based content management services and platforms have impacted the way personal and corporate information are stored, and have also impacted the way personal and corporate information are shared and managed. Individuals can avail themselves of such storage and management services to store and share large volumes of content objects such as files and documents.

Enterprises (e.g., companies, firms, etc.) might also want to use cloud-based content management platforms to secure, store and manage proprietary content objects, while enhancing the experience and productivity of their workforce (e.g., active employees) and/or their customers (e.g., clients, vendors, contractors, partners, etc.). The enterprise might want to provide their active employees access to the flexible provisioning (e.g., access, roles, sharing, etc.) and collaboration components (e.g., tasks, comments, workflow, etc.) delivered by a content management platform provider.

An Enterprise File Storage and Sharing (EFSS) system is a type of computing platform that provides file storage and collaboration capabilities. While EFSS systems make it very easy to access and share documents; by the same token, such systems also make it easy for malicious users to exfiltrate sensitive or proprietary documents.

Various legacy techniques have been implemented to provide security to documents. For example, many systems implement security at the firewall level that seek to prevent improper access by third parties. However, such systems, while useful to prevent attacks by outside parties, may become useless if the security problem is being perpetrated by a malicious "insider" that is already within the firewall, and therefore will not be able to stop such malicious insiders from exfiltrating sensitive documents.

The problem to be solved is therefore rooted in technological limitations of the legacy approaches. Improved techniques, in particular improved application of technology, are needed to address the problem of implementing document and file security in content management platforms.

What is needed is a technique or techniques to improve the application and efficacy of various technologies as compared with the application and efficacy of legacy approaches.

SUMMARY

The present disclosure provides improved systems, methods, and computer program products suited to address the aforementioned issues with legacy approaches. In some embodiments, the present disclosure provides a detailed description of techniques used in systems, methods, and in computer program products for performing user behavior analysis to detect anomalous downloads in content management platforms, where feature vectors are generated for both a comparison time period and an anomaly time period to analyze and detect anomalous behavior.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings illustrate the design and utility of embodiments of the present disclosure, in which similar elements are referred to by common reference numerals. In order to better appreciate the advantages and objects of embodiments of the disclosure, reference should be made to the accompanying drawings. However, the drawings depict only certain embodiments of the disclosure, and should not be taken as limiting the scope of the disclosure. The drawings use like reference numerals to identify like elements, and unless otherwise specified, any description for that element may be applicable to each use of that reference numeral were appropriate.

FIG. 1 illustrates an example diagram of a system implementing some embodiments of the invention.

FIGS. 4A-1, 4A-2, 4A-3, and 4A-4 illustrate a possible approach to generate file clusters using activity graphs.

DETAILED DESCRIPTION

Various embodiments are described hereinafter with reference to the figures. It should be noted that the figures are not necessarily drawn to scale. It should also be noted that the figures are only intended to facilitate the description of the embodiment(s) and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated.

Some embodiments of the present disclosure provide improved systems, methods, and computer program products suited to address the aforementioned issues with legacy approaches for anomaly detection, where feature vectors are generated for both a comparison time period and an anomaly time period to analyze and detect anomalous behavior.

Figures 1, 4A:
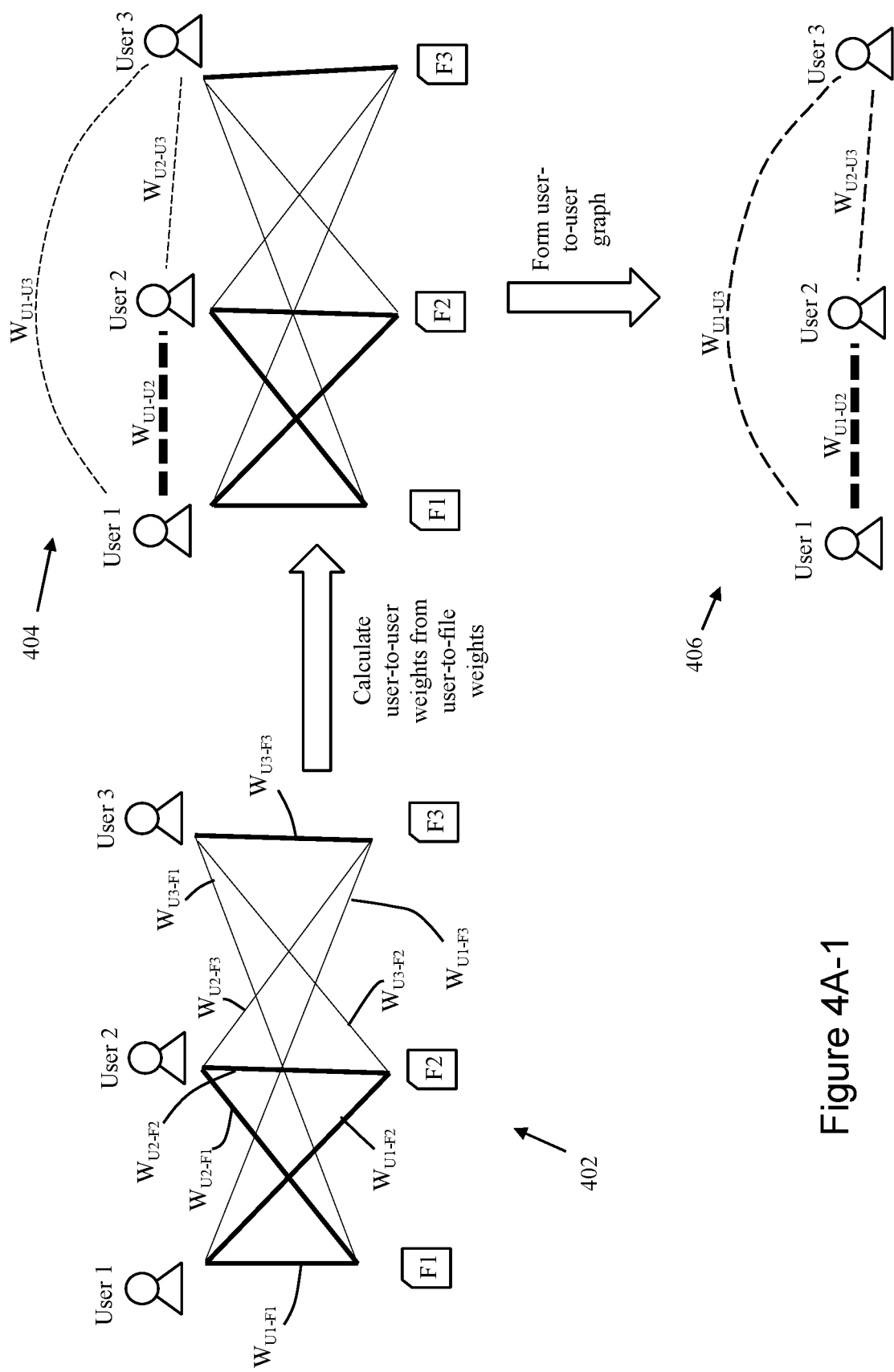
Figures 2, 4A:
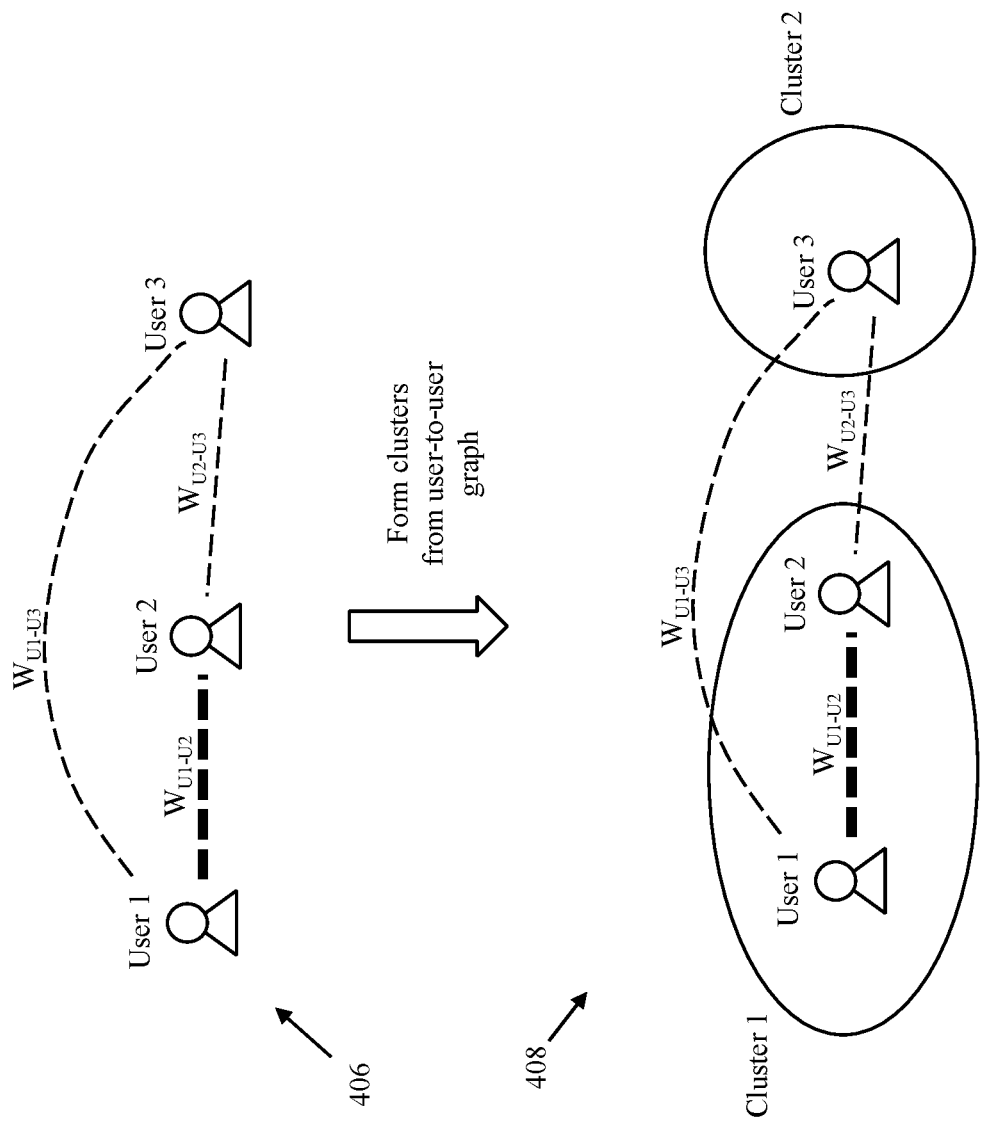
Figures 3, 4A:
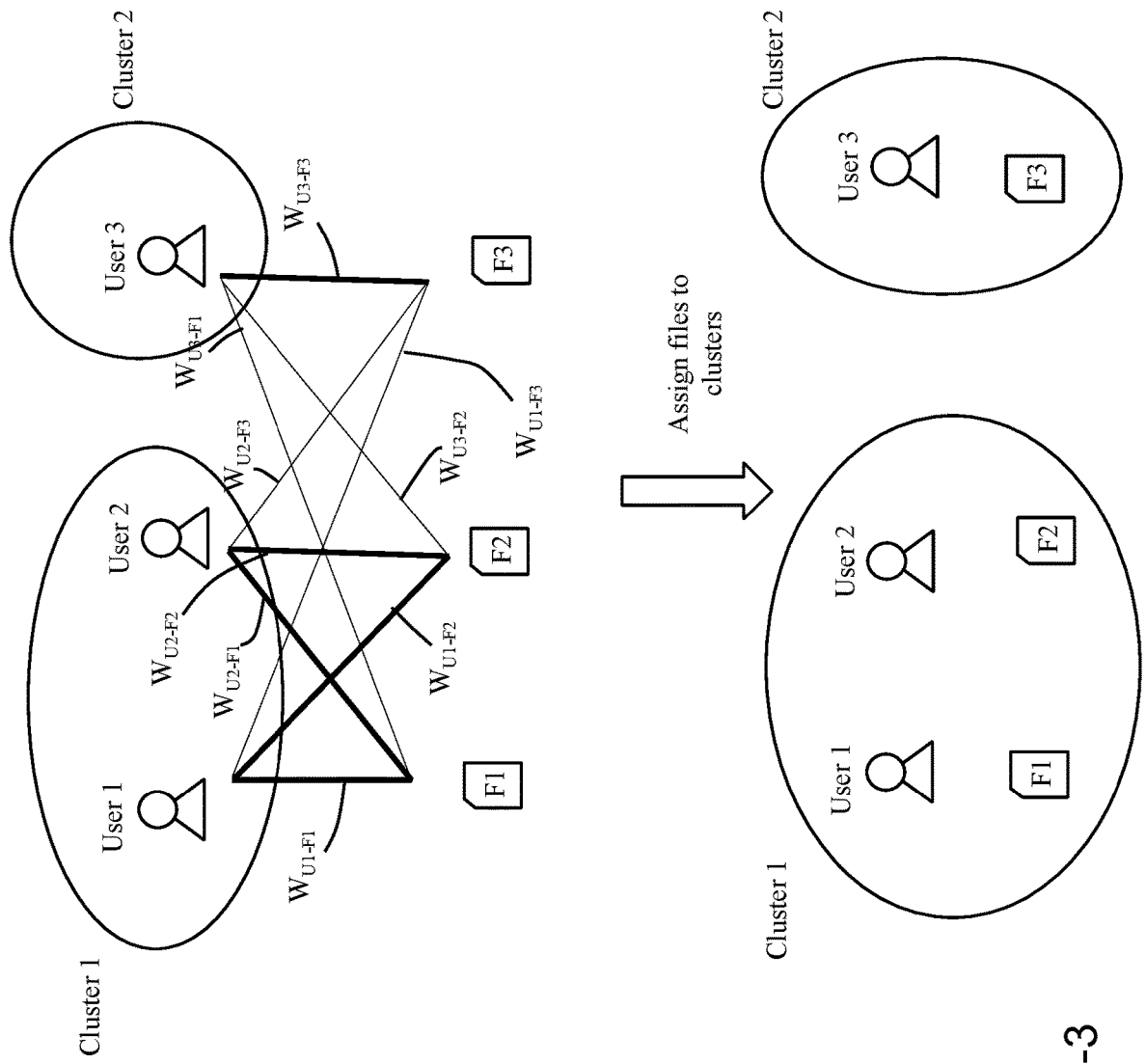

FIG. 1 illustrates a diagram of an example system having a content management server 104 of a cloud service (e.g., collaboration or file sharing platform) and/or cloud storage accounts with capabilities for enabling a desktop application such as described herein for accessing a cloud-based collaboration platform. The system depicted in FIG. 1 may be broadly referred to as a cloud-based collaboration platform.

One or more users may use one or more client devices to access the content management server 104. The client devices can be any system and/or device, and/or any combination of devices/systems that is able to establish a connection, including wired, wireless, cellular connections with another device, a server and/or other systems such as server 104. The client devices will typically include a display and/or other output functionalities to present information and data exchanged between among the devices and/or the server 104. For example, the client devices can include mobile, hand held or portable devices or non-portable devices and can be any of a server desktop, a desktop computer, a computer cluster, or portable devices including, a notebook, a laptop computer, a handheld computer, a palmtop computer, a mobile phone, a cell phone, a smart phone, a PDA, a Blackberry device, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows, etc.), Android, Blackberry OS, Embedded Linux platforms. In one embodiment, the client devices and the server 104 are coupled via a network. In some embodiments, the devices and server 104 may be directly connected to one another. The input mechanism on the client devices can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at the client devices through one or more of the above input mechanism, or others, can be used in the disclosed technology by any user or collaborator (hereinafter referred to collectively as "user") for accessing a cloud-based collaboration platform or online collaboration platform (e.g., hosted by the host server 104).

The collaboration platform or environment hosts workspaces with content items that one or more users can access (e.g., view, edit, update, revise, comment, download, preview, tag, or otherwise manipulate, etc.). To host the content items, the collaboration platform may store the uploaded content items in a data repository. The data repository may represent the collective data storage facilities of the cloud-based collaboration platform and may include any one data storage components operating at any one or more physical devices. For example, the data repository may be distributed across multiple network connected machines. As mentioned, the data repository may store digital content that is hosted in the cloud-based collaboration platform (i.e., content uploaded by users/collaborators). The data repository may also store code including the instructions, rules, models, etc. for performing one or more processes of the cloud-based collaboration platform. For example, the cloud-based collaboration platform may host various user-facing applications (e.g., Microsoft® Word) that can be used by users/collaborators for interacting with stored digital content. Similarly, the cloud-based collaboration platform may host various processing applications that operate in the background, for example, to perform various automated tasks.

A content item (F1-Fn) stored/accessed within the cloud-based collaboration platform can generally include any type of digital or electronic content that can be viewed or accessed via an electronic device. The digital content can include, for example, pdf files, docs, slides (e.g., Powerpoint slides), images, audio files, multimedia content, web pages, blogs, etc. (which are collectively referred to herein illustratively and without limitation as a "file").

A workspace can generally refer to any grouping of a set of digital content in the collaboration platform. The grouping can be created, identified, or specified by a user or through other means. This user may be a creator user or administrative user, for example. In general, a workspace can be associated with a set of users or collaborators which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on content items such each user can upload, open, view/preview/see, edit, revise, comment upon, and/or annotate specific content items through their own user devices. For example, a user can upload a document to a work space for other users to access (e.g., for viewing, editing, commenting, signing-off, or otherwise manipulating). The user can login to the online platform and upload the document (or any other type of content item) to an existing work space or to a new work space. The document can be shared with existing users or collaborators in a work space.

In some embodiments, anomaly detection is performed by analyzing user behavior over at least two different time periods, including a first time period (which may also be referred to herein as a "comparison time period") and a second time period (which may also be referred to herein as an "anomaly time period"). In particular, user-to-file interactions are captured for a particular user over these time periods, and data pertaining to the user-to-file interactions are used to generate feature vectors, including feature vector 132*a* for the first time period and feature vector 132*b* for the first time period.

A behavior analysis module 120 is employed to analyze the feature vector(s), and to generate a score based upon the analysis across the two feature vectors. As described in more detail below, the score that is generated is indicative of whether or not the user has engaged in anomalous behavior. Identified anomalous events 122 are provided to a user or administrator, e.g., by generating an alert or report that is sent to an administrator console 124.

Figure 2:
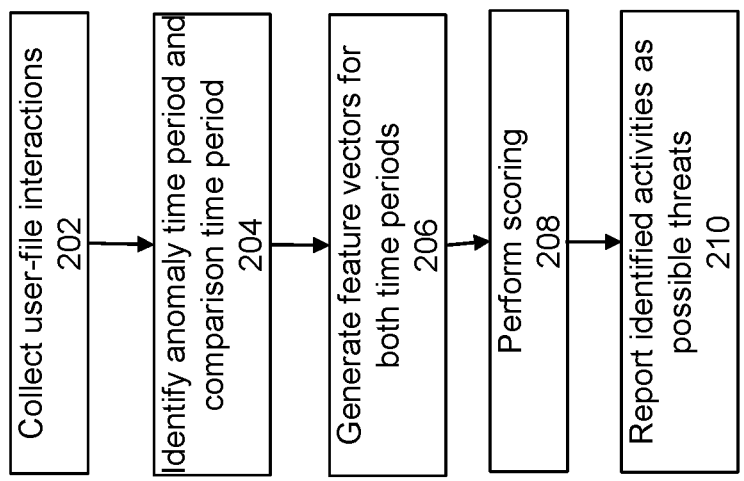
FIG. 2 illustrates a flowchart of an approach to perform some embodiments of the invention.

FIG. 2 illustrates a flowchart of an approach to perform some embodiments of the invention. At 202, data regarding user-to-file interactions are collected. For example, the invention may be applied in the context of a content management server of a cloud service, and the collected interaction data that is specifically collected in step 202 may be reflective of this particular context, whereas interaction data for another context may reflect a different set of collected data. In some embodiments, the collected data pertains to user-to-file interaction data corresponding to one or more of the following the four components: (a) User ID (abbreviated as uid); (b) File ID (abbreviated as fid); (c) Interaction type (abbreviated as itype, where nonlimiting examples of itype are zip_download, drive_download, exp_download); and/or (d) Interaction time (abbreviated as itime).

At step 204, two periods of time are identified, which are the anomaly period and the comparison period. The earlier time period (comparison period) provides an earlier-in-time set of data that can be compared against. The later time period (anomaly period) is the more recent data set that is checked against the earlier data to identify possible malicious behavior. For example, the anomaly period might be the week ending at midnight 2019-08-25, and the comparison period might be the week ending at midnight 2019-08-17.

At step 206, feature vectors are generated for the user behavior for each of the time periods, where the user behavior for the two time periods can be compared to identify possible anomalies. In some embodiments, the feature vectors are generated by identifying file clusters/computing weights, and then producing vectors. Further details regarding an approach to generate feature vectors are described below in conjunction with a description of FIG. 3.

At step 208, scoring is generated by performing a comparison of the feature vectors for both the comparison time period and the anomaly time period. In some embodiments, the magnitudes of the two vectors are compared in a process to generate the score, where the score is particularly based upon a difference between the two magnitudes. The general idea in this embodiment is that an increase in a magnitude difference would be more indicative of anomalous events, whereas a decrease in magnitude would be less indicative of an anomaly. Further details regarding an approach to implement scoring are described below in conjunction with a description of FIG. 7.

At step 210, a report may be made of any anomalous behavior that is determined from the scoring. Once the anomaly scores for all the users are computed, in some embodiments, the approach deems all the users with a positive score (e.g., a positive magnitude difference between the two time periods) as a possible anomaly. In an alternative embodiment, a score above a pre-determined threshold T is deemed to be anomalous/possibly anomalous. There are numerous ways to determine T, such as for example: (a) Set T such that a fixed percentage of users fall above the threshold; and/or (b) Set T such that a fixed number of users fall above the threshold.

Figure 3:
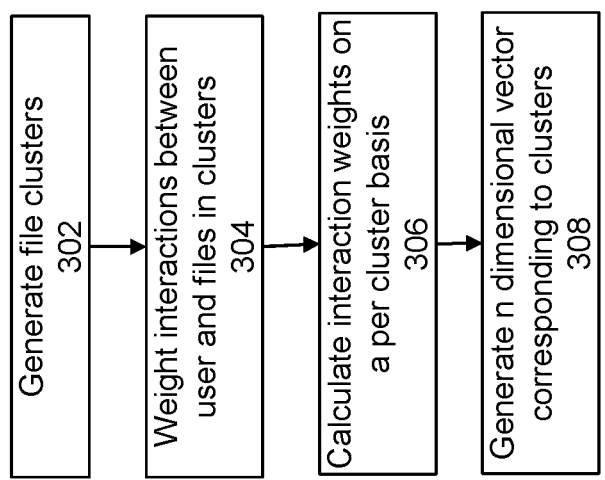
FIG. 3 shows a detailed flowchart of an approach to generate feature vectors according to some embodiments of the invention.

FIG. 3 shows a detailed flowchart of an approach to generate feature vectors according to some embodiments of the invention. The feature vectors are generated for the user behavior for each of the multiple time periods, where the user behavior for the two time periods can be compared to identify possible anomalies. The feature vectors are generated by identifying file clusters/computing weights, and then producing vectors.

At step 302, a set of file clusters are created to generate the feature vectors. Each of the clusters comprises a set of files for which it is determined that they have enough of a relationship to each other such that they should be grouped together for analysis purposes. In the current embodiment, the clusters are mutually exclusive, where each file can only belong to one cluster. Alternate embodiments may have a different approach where a file may belong to multiple clusters.

The file clusters may be generated using any suitable approach. One possible approach is to generate activity graphs that correspond to interactions that occur between specific user(s) and a specific file(s) within the system. For example, the users and files may correspond to nodes within the graph and the interactions correspond to edges within the graph. A weight can associated with each user-to-file interaction/edge in the activity graph. The activity graph can be formed by, for every file, by identifying users connected to that file. Clustering can be performed to cluster the activity graphs, where files are assigned to each of the clusters. The files to user clusters based on "affinity", where the affinity of the file is computed relative to each one of the user clusters. The file is assigned to the cluster that has highest affinity to it.

Figures 4, 4A:
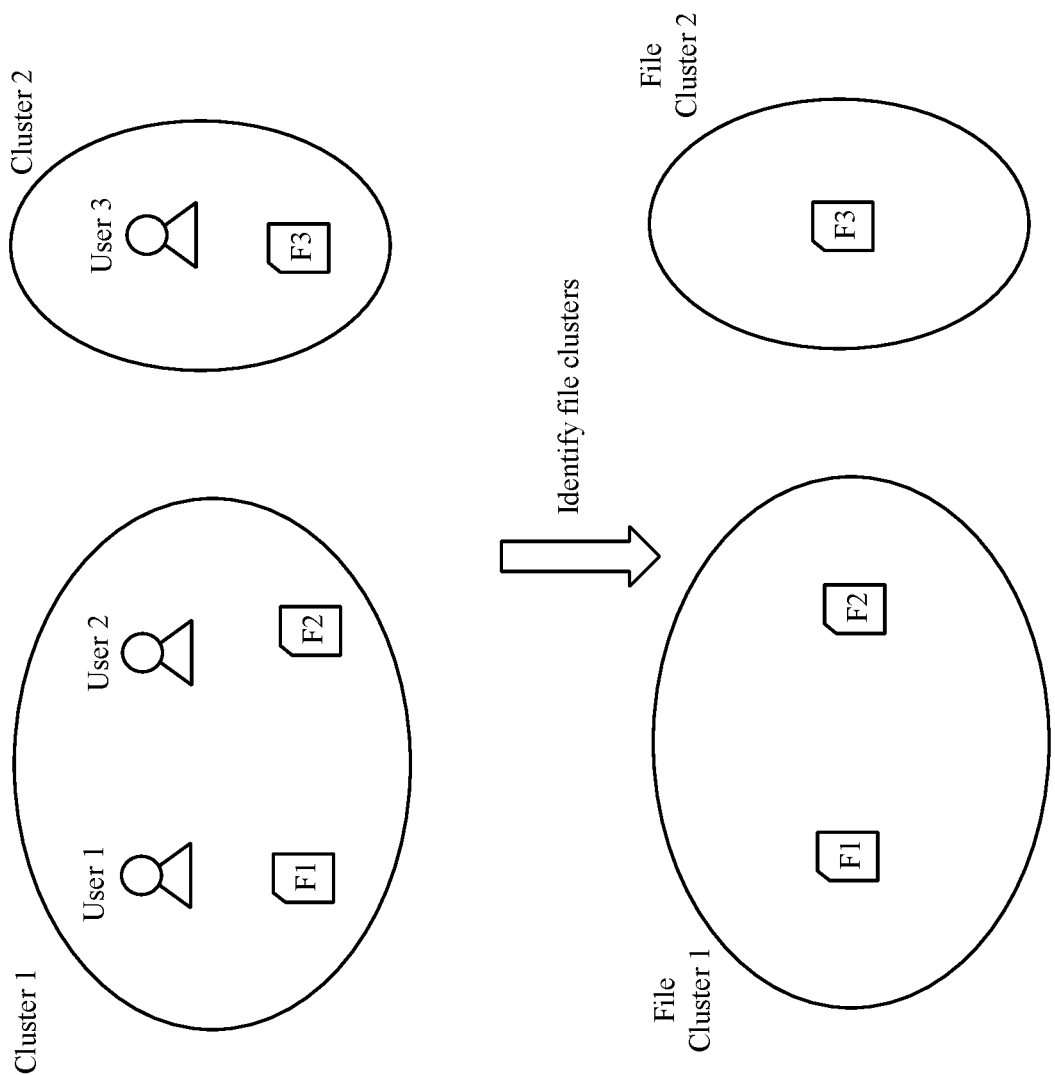

FIGS. 4A-1 through FIG. 4A-4 illustrate a possible approach to generate file clusters using activity graphs. FIG. 4A-1 illustrates an example user-to-file activity graph 402 for users 1, 2, 3 with respect to their interactions with files F1, F2, and F3. The users and files corresponds to nodes within the graph and the interactions correspond to edges within the graph. The activity graph can be formed by, for every file, generating a list of all users connected to that file. A "weight" is associated with each user-to-file interaction/edge in the activity graph. In some embodiments, the weight is calculated by summing the numbers of activities (and/or certain selected types of activities) between a specific user and a specific file. In the illustrated example of this figure, it can be seen that certain of the edges are represented with thicker lines and certain edges have thinner lines. The thicker lines represent weights that indicate greater user-to-file activities (e.g., $W_{U1-F1}$, $W_{U1-F2}$, $W_{U2-F1}$, $W_{U2-F2}$, and $W_{U3-F3}$), while the thinner lines indicate lower levels of user-to-file activities (e.g., $W_{U1-F3}$, $W_{U2-F3}$, $W_{U3-F1}$, and $W_{U3-F2}$).

The weights in the activity graph 402 can therefore be used to generate a weighted user-to-user graph 404, where user-to-user weights are calculated from the user-to-file graph. For example, $W_{U1-U2}$ represents the weights of the link between User 1 and User 2, $W_{U1-U3}$ represents the weights of the link between User 1 and User 3, and $W_{U2-U3}$ represents the weights of the link between User 2 and User 3. Finally, as shown in graph 406, the user-to-user graph is formed by collapsing graph 404 to include just the users, as well as the links between the users.

Any suitable approach to determining weight values can be employed in embodiments of the invention. In at least one embodiment, for every file shared by two users, the smaller file-to-user weight is added to a specific user-to-user link. For example, an illustrative approach to implementing weight $W_{U1-U2}$ is where this weight represents the smaller of the weights for the common files shared by User 1 and User 2. However, as would be understood by those of ordinary skill in the art, other approaches may also be employed to calculate these weights. As can be seen in the figure, the weight $W_{U1-U2}$ of the link between user 1 and user 2 is represented by a thick line, indicating that these two users both tend to access the same set of files. On the other hand, the weights $W_{U1-U3}$ and $W_{U2-U3}$ are represented by thin lines, indicating that the smaller of the weights for the common files shared by these users is very small, indicating that user 1 and user 2 tend not to access the same files as user 3.

As shown in FIG. 4A-2, clustering is performed to cluster the user-to-user graph, where clustering is applied to graph 406 to identify users 1 and 2 in revised graph 408 as belonging to a first cluster, while user 3 is identified as belong to a second cluster. In some embodiments, Markov clustering can be used as the technique to cluster the user-user graph. Next, as shown in FIG. 4A-3, files are assigned to each of the clusters. The files to user clusters based on "affinity", where the affinity of the file is computed relative to each one of the user clusters. The file is assigned to the cluster that has highest affinity to it. With regards to affinity, the affinity of a file to a cluster is the sum of the weights of the connections between the file and all the users in the cluster. As illustrated in FIG. 4A-3, where files F1 and F2 are assigned to cluster 1. This is because the sum of the high weights of the connections between files F1 and F2 to the users 1 and 2 in cluster 1 (the weights $W_{U1-F1}$, $W_{U1-F2}$, $W_{U2-F1}$, $W_{U2-F2}$ with the thick lines) far exceeds the sum of the weights of the connections between files F1 and F2 to user 3 in cluster 2 (the weights $W_{U3-F1}$ and $W_{U3-F2}$ with the thin lines). In contrast, file 3 is assigned to cluster 2. This is because the sum of the high weight of the connection between file F3 to user 3 in cluster 2 (the weight $W_{U3-F3}$ with the thick line) far exceeds the sum of the weights of the connections between file F3 to users 1 and 2 in cluster 1 (the weights $W_{U1-F3}$ and $W_{U2-F3}$ with the thin lines).

Finally, as shown in FIG. 4A-4, the file clusters can be determined by identifying the specific files within each cluster. Here, file cluster 1 includes files F1 and F2, whereas file cluster 2 include file F3.

Figure 4B:
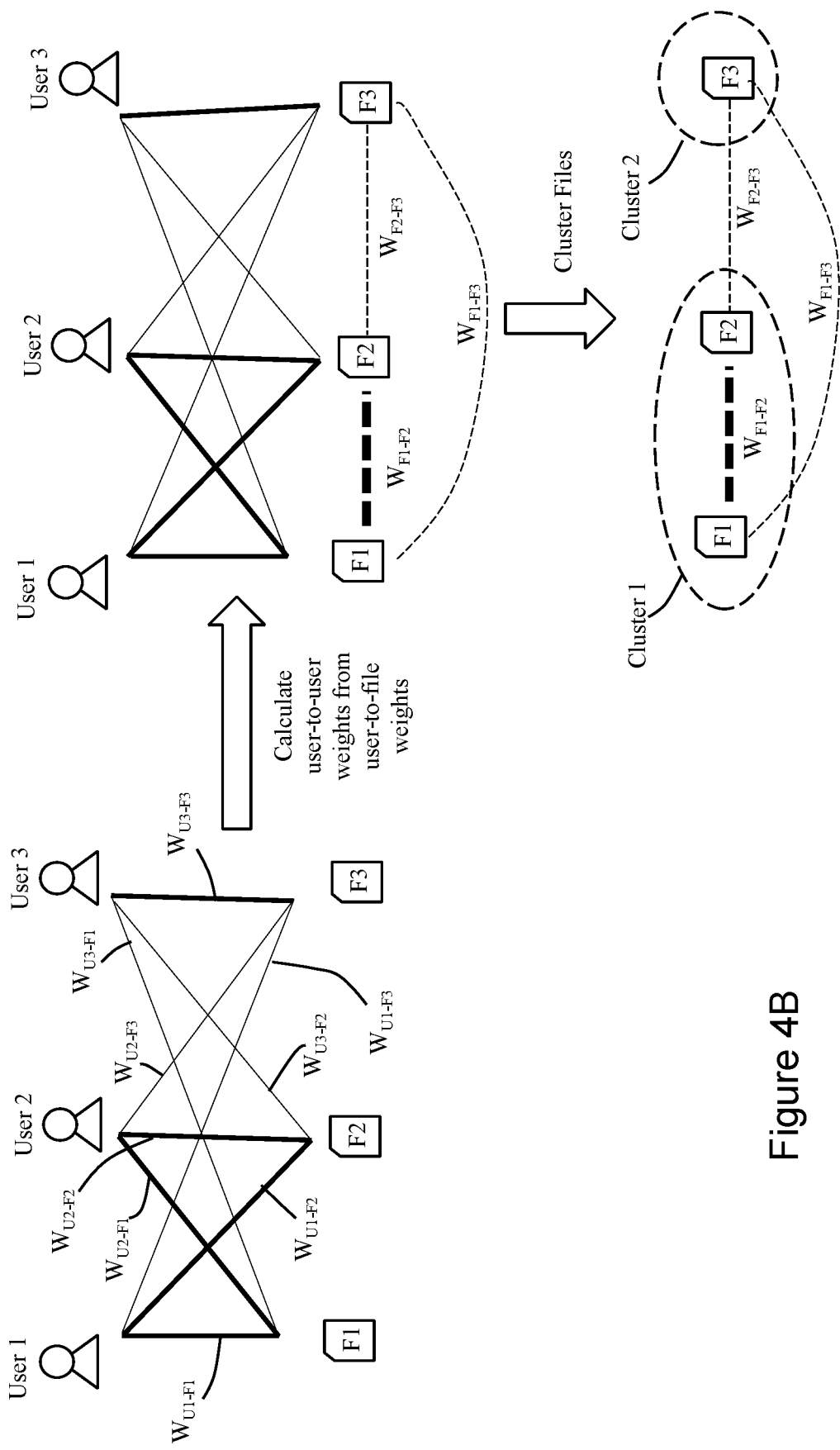
FIG. 4B illustrates an alternative approach to generate the file clusters.

FIG. 4B illustrates an alternative approach to generate the file clusters. In this approach, the weights between the files themselves from the activity graph are used to identify the different files that belong to each cluster. This approach avoids the need to take a first step of generating and graphing the user-to-user weights (in the approach of FIGS. 4A-1 to 4A-4) before forming the file clusters.

One reason for using the approach of FIG. 4A instead of the approach of FIG. 4B is because the number of files tend to be greater than the number of relevant users in the system, and hence it may be more efficient to graph the user-to-user weights to form the file clusters rather than attempting to directly graph the file-to-file weights.

Further details regarding an example approach to use activity graphs to implement clustering is described in co-pending U.S. patent application Ser. No. 16/115,069, which is hereby incorporated by reference in its entirety.

Returning back to the flow of FIG. 3, at 304, the next step is to apply a weighting to the interactions between the user and the files within each of the clusters. A weight function can be used, where W(fid, itype) assigns a weight to a given interaction. The weight can be based at least on part on any of multiple one or more factors. For example, the weight can be based on the interaction type, the nature of the file, and/or size of file interaction. Further details regarding various illustrative approaches to implement weighting is described below with reference to FIGS. 8A through 15.

Figure 5:
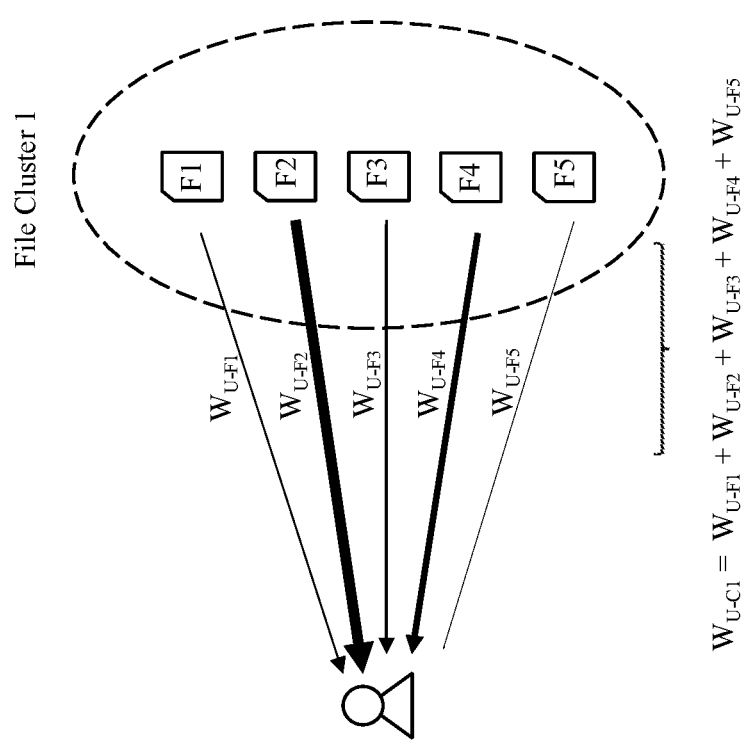
FIG. 5 illustrates an example approach for determining a weight for the interactions between a user and the files within a given cluster.

Next, at step 306, interactions weights are calculated in a per cluster basis. FIG. 5 illustrates an example approach for determining a weight for the interactions between a user and the files within a given cluster. Here, the user has engaged in various interactions with files F1-n within cluster 1. Each of these interactions with the different files has its own specific weight. For example the interaction between the user and file F1 is $W_{U1-F1}$ with a thin line indicating a relatively low weight, whereas the interaction between the user and file F2 is $W_{U1-F2}$ with a thick line indicating a relatively high weight. The overall weight $W_{U-C1}$ for the interactions between the user and cluster 1 is the total of the individual weights for the interactions between the user and the multiple files in the cluster. This type of weight value is obtained for each of the different clusters for which interactions have occurred between the user and files in the respective clusters.

Figure 6:
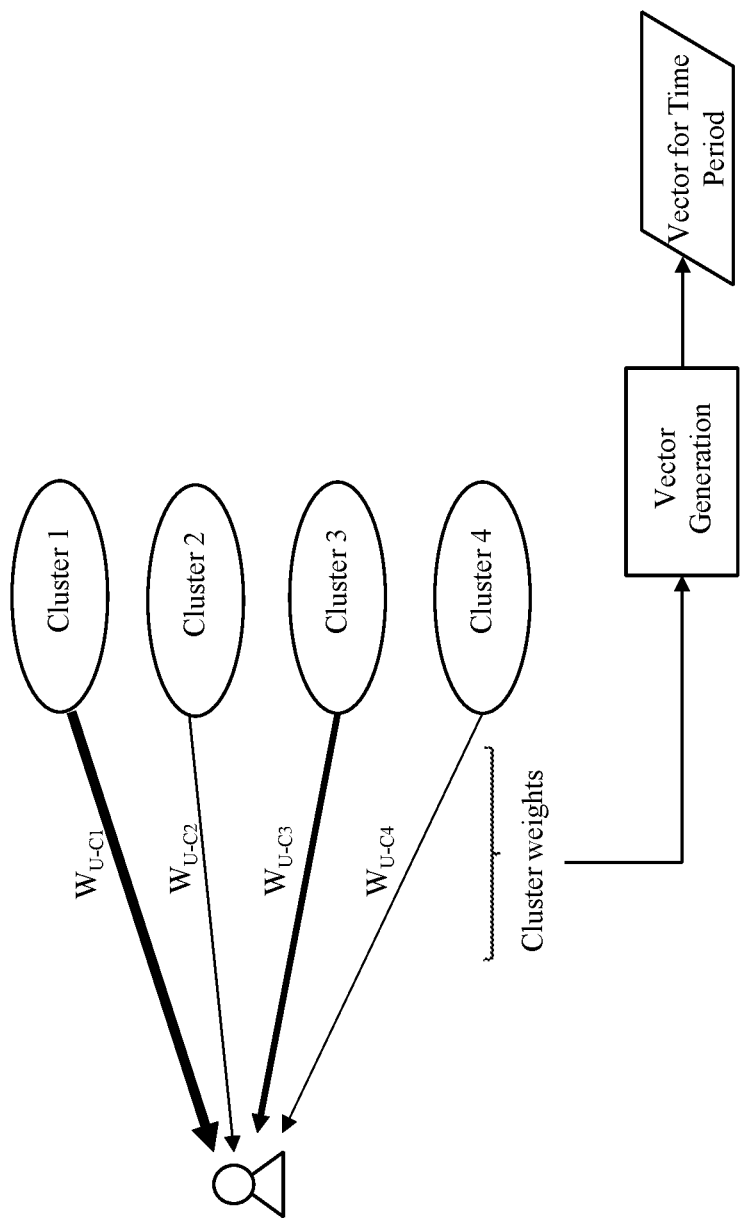
FIG. 6 illustrates an approach to generate a n-dimensional vector.

At step 306, feature vectors are then generated based upon the above. As illustrated in FIG. 6, this action generates a n-dimensional vector that corresponds to the weights between the user and each of the clusters having files for which interactions have occurred with the user. For every user, two feature vectors are computed: one for the anomaly period, and one for the comparison period.

In one embodiment, the feature vector is a real n dimensional vector, where n is the number of clusters. To compute the feature vector for a user with user id uid in a given period p, the approach will first compute the function L(uid, fid, p) for each file fid. L(uid, fid, p) represents the total interaction weight between the user and the file in this period. In some embodiments, this can be computed as follows: (a) find the set of all interactions (uid, fid, itype, itime) where itime falls in the given period; (b) for each (fid, itype) combination in this set, compute the W(fid, itype), where this is done for each interaction type, once per interaction type (the number of interactions does not matter in some embodiments); and (c) add up W(fid, itype) for all interaction types to get L(uid, fid, p).

Assume that the clusters are C1, C2, . . . to Cn, where each Ci is a set of files. Then, the feature vector F(uid,p) for the user u in the period p is an n dimensional vector. This is computed where F(uid,p) for the user u in the period p is an n dimensional vector. F(uid,p) is computed as follows: F(uid,p) [i]=sum of L(uid, fid, p) for all the files fid in the cluster Ci.

Once the feature vectors for the two time periods have been identified, then the current embodiment will perform a score computation to attempt to identify the presence (or not) of an anomaly.

Figure 7:
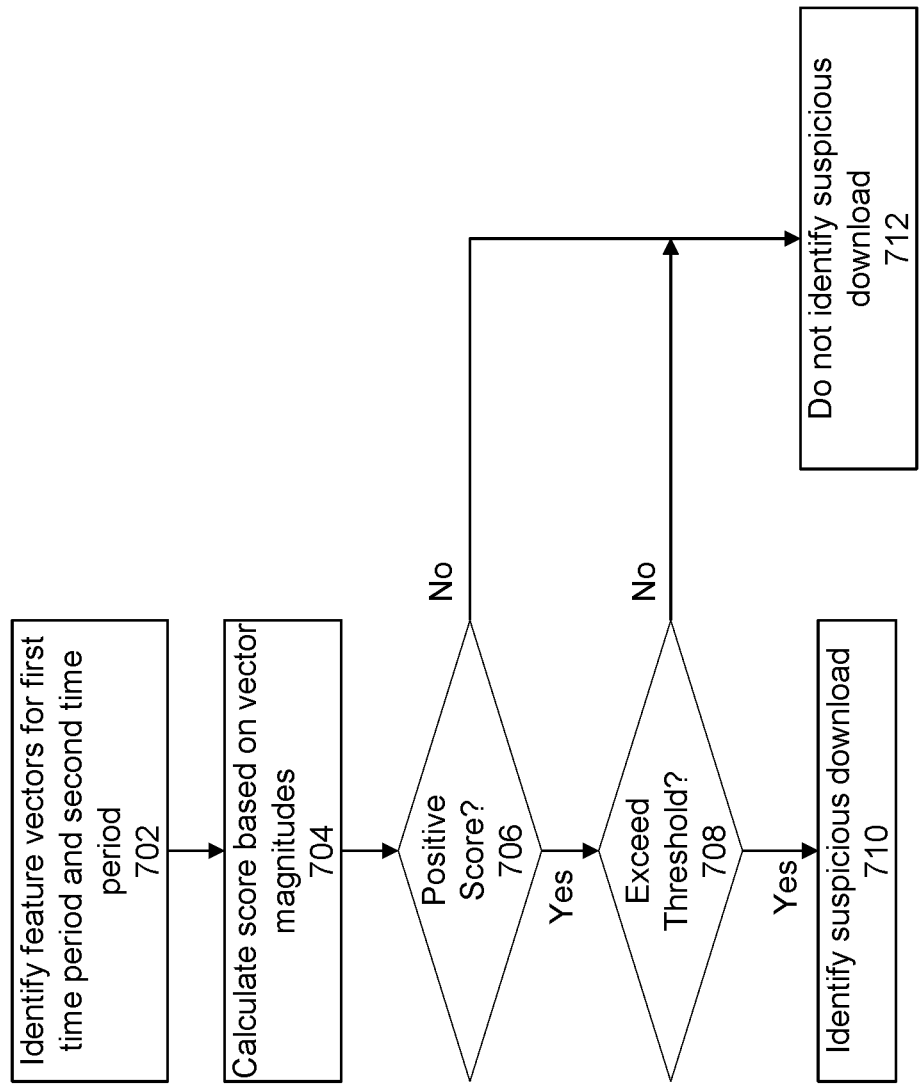
FIG. 7 shows a detailed flowchart of an approach to perform score generation for anomaly detection according to some embodiments of the invention.

FIG. 7 shows a detailed flowchart of an approach to perform score generation for anomaly detection according to some embodiments of the invention. At step 702, the processing will identify the feature vectors for the first and second time periods (e.g., for the comparison and anomaly time periods), where the feature vectors for these time periods are formed using the process described above. The anomaly score measures, for each user, how much their behavior has changed during these two periods.

To compute the anomaly score for the user with the ID uid, the approach first identifies the feature vectors F(uid, pa) and F(uid, pc), which are the feature vectors for the anomaly and comparison periods. Here, pa refers to the anomaly period, and pc refers to the comparison period. These feature vectors represent the behavior profiles of the user in these periods.

At step 704, a score is determined based upon the vector magnitudes for the two time periods. This approach computes the following quantities: (a) D=Euclidean distance between F(uid, pa) and F(uid, pa)=‖F(uid,pa)−F(uid, pa)‖; (b) Ma=Magnitude of F(uid, pa)=‖F(uid,pa)‖; and (c) Mc=Magnitude of F(uid, pc)=‖F(uid, pc)‖.

At this point, the score can be computed as follows: Score(uid)=D*sign(Ma−Mc). Here, the score is the Euclidean distance multiplied by the sign of the difference between the magnitudes of the two feature vectors. In other words, if the magnitude decreased, the score is negative, and if the magnitude increased, the score is positive. In other words, if the activity increases, then the score is positive, and if the activity decreases, then the score is negative.

In the current embodiment, at 706, a determination is made whether the score is positive or negative. In some embodiments that are concerned with malicious downloads in particular (as opposed to other types of malicious behavior), the detection system may only be interested in positive numbers, i.e., where the magnitude increases. In this context, if the numbers decrease, this may likely not be a sign of malicious downloads and thus if the score is negative the process proceeds to 712 where the activity does not indicate a suspicious download activity.

At step 708, a determination can be made whether the score exceeds a designated threshold that indicates the presence of a possible anomaly. In one embodiment, the mere existence of a positive score would be indicative of a suspicious download, and therefore in this embodiment a separate step 708 is not necessary. In an alternative embodiment, even if a positive score is obtained, a threshold is nonetheless specified where a score above the threshold would be indicative of a suspicious download and a score below that threshold would not be indicative of a suspicious download.

If the score is indicative of a suspicious download, then the process proceeds to 710 where the system may make an indication of the suspicious download activity (e.g., by generating an alert or a report to an administrator).

As discussed above, weighting may be applied to the interactions between the user and the files within each of the clusters. The weighting is used to either increase or decrease the relative significance or impact of a given interaction for the above-described analysis process. The basis for applying a weighting to an interaction can be premised upon any suitable factor.

Figure 8A:
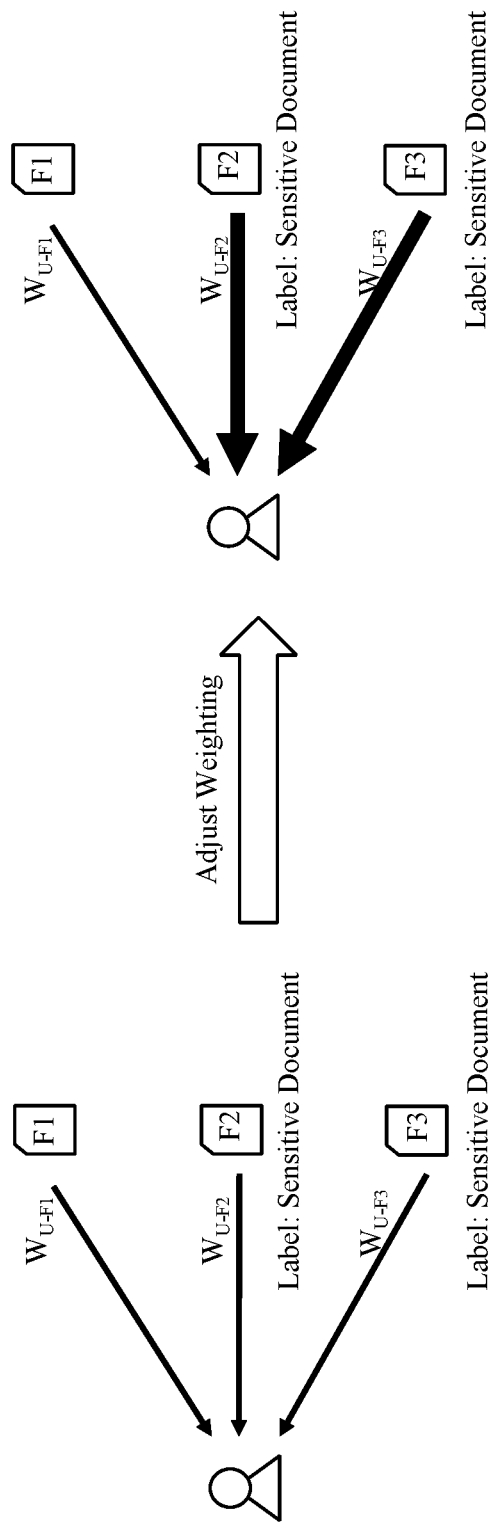
FIGS. 8A and 8B illustrate an approach to implement weighting.

For example, consider if it is desired to apply weighting based upon the perceived "sensitivity" of a given file accessed by a user, where a file is labelled as being sensitive if there is an aspect to a file that indicates that the file should be subject to additional protections or considerations, e.g., for files that include confidential, sensitive, legally protected, or otherwise important information or other content. As shown in FIG. 8A, certain documents could be labelled as being a sensitive documents, and hence any interactions involving these labelled documents could have their weights adjusted to increase the weights of such interactions. When the weight calculation process of FIG. 5 is engaged, the extra weighting assigned to interactions involving sensitive files within a file cluster would tend to increase the overall weight for a user relative to that file cluster.

Figure 8B:
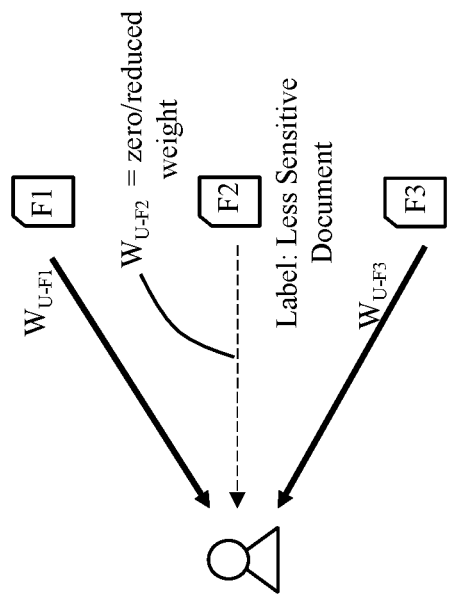
Figure 8B:
Figure 8B:
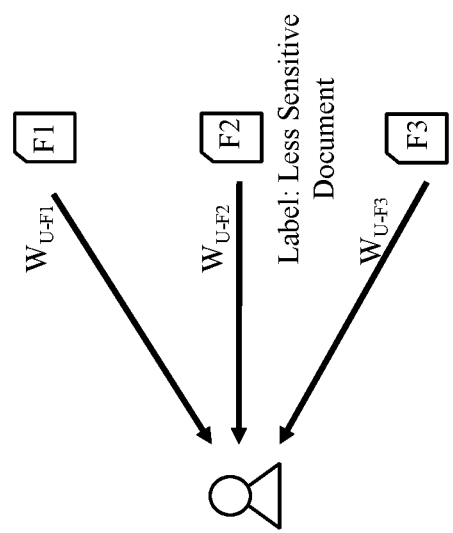

The opposite is also true, where negative weightings can apply to files that are deemed to be less sensitive. For example, certain types of files are considered to have content that is considered to be of little importance or sensitivity, such as routine log files that are produced over the course of a day by operation of perfunctory processes in the computing system. Such unimportant files may be associated with labels indicating their low level of sensitivity. As shown in FIG. 8B, any interactions involving these less sensitive documents could have their weights adjusted to decrease the weights of such interactions, e.g., to set the weight of such interactions to either zero or a very low weight. When the weight calculation process of FIG. 5 is engaged, the lowered weighting assigned to interactions involving less sensitive files within a file cluster would tend to decrease the overall weight for a user relative to that file cluster.

Figure 9:
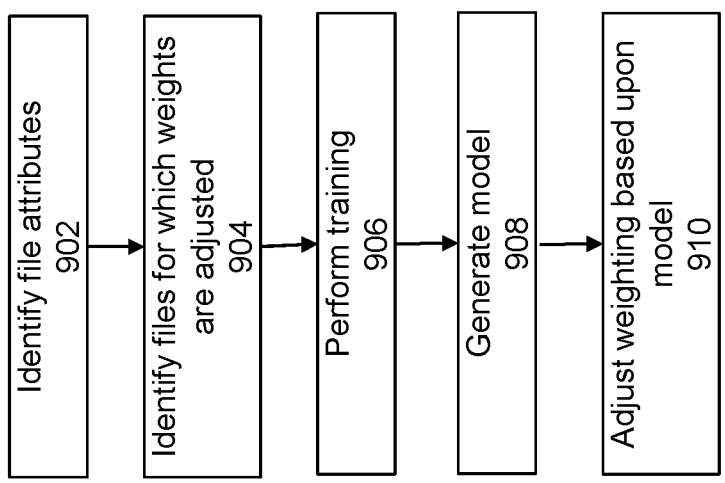
FIG. 9 shows a flowchart of an approach to implement weighting as part of a learning process according to some embodiments of the invention.

FIG. 9 shows a flowchart of an approach to implement weighting as part of a learning process according to some embodiments of the invention. At 902, one or more file attributes are identified for the files in the system which may be pertinent to the weighting process. Some attributes that may be considered as pertinent to affecting the weight of a given interaction can be, for example, based on the interaction type, the nature of the file, and/or size of file interaction. At 904, files and/or interactions involving files are identified for which weights have previously been adjusted. Each of these files/interactions correspond to information about their attributes, where these attributes may be used as part of a training process.

Thereafter, at 906, training is performed upon the gathered data. Any suitable process may be used to perform training to generate a model at step 908 for implementing the weightings. For example, machine learning is a technique that can be used implement the training and model generation steps. Machine learning pertains to systems and processes that allow a machine to automatically learn about a given topic, and to improve its knowledge of that topic over time as new data is gathered about that topic. The learning process can be used to derive an operational function that is applicable to analyze the data about that system, where the operational function automatically processes data that is gathered from the activity or system being monitored. This approach is useful, for example, when a vast amount of data is collected from a monitored system such that the data volume is too high for any manual-based approach to reasonably and effectively perform data review to identify patterns within the data, and hence automated monitoring is the only feasible way that can allow for efficient review of that collected data. Machine learning is typically implemented by obtaining a set of training data that is adjudged as being an adequate representative for the system data to be monitored. A learning algorithm then takes that training data and implements a training method to obtain a model for the system, where the model usually corresponds to a predictive model that can hopefully predict future outcomes based upon the past behavior and observed datapoints.

At step 910, weightings are adjusted based upon the model that was generated. The model is used to adjust, either upwards or downwards, the weight that is applied to a given user to file interaction.

Figure 10A:
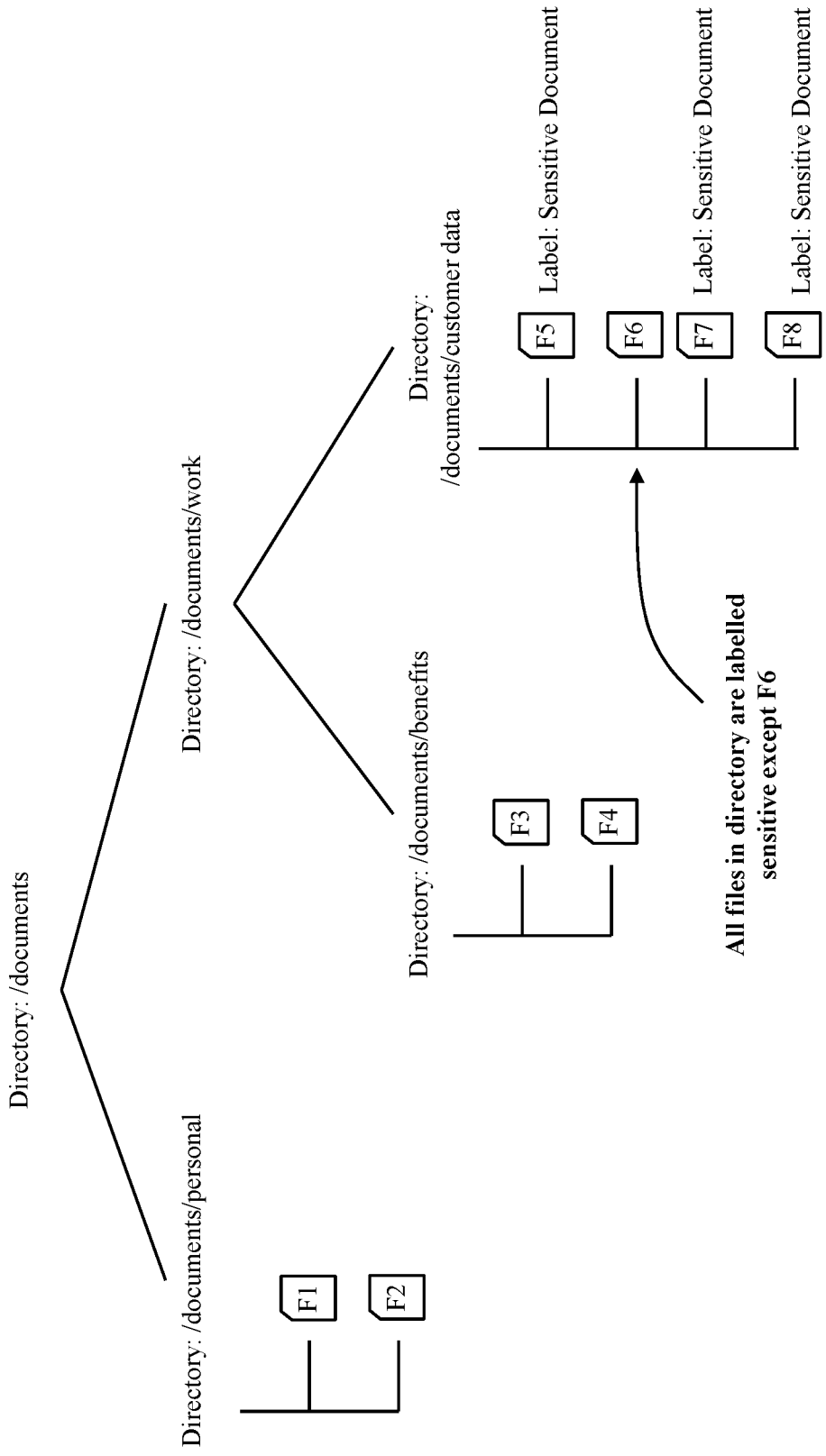
FIGS. 10A-B illustrates an example scenario where weights can be configured based upon a file path or file location for a document.
Figure 10B:
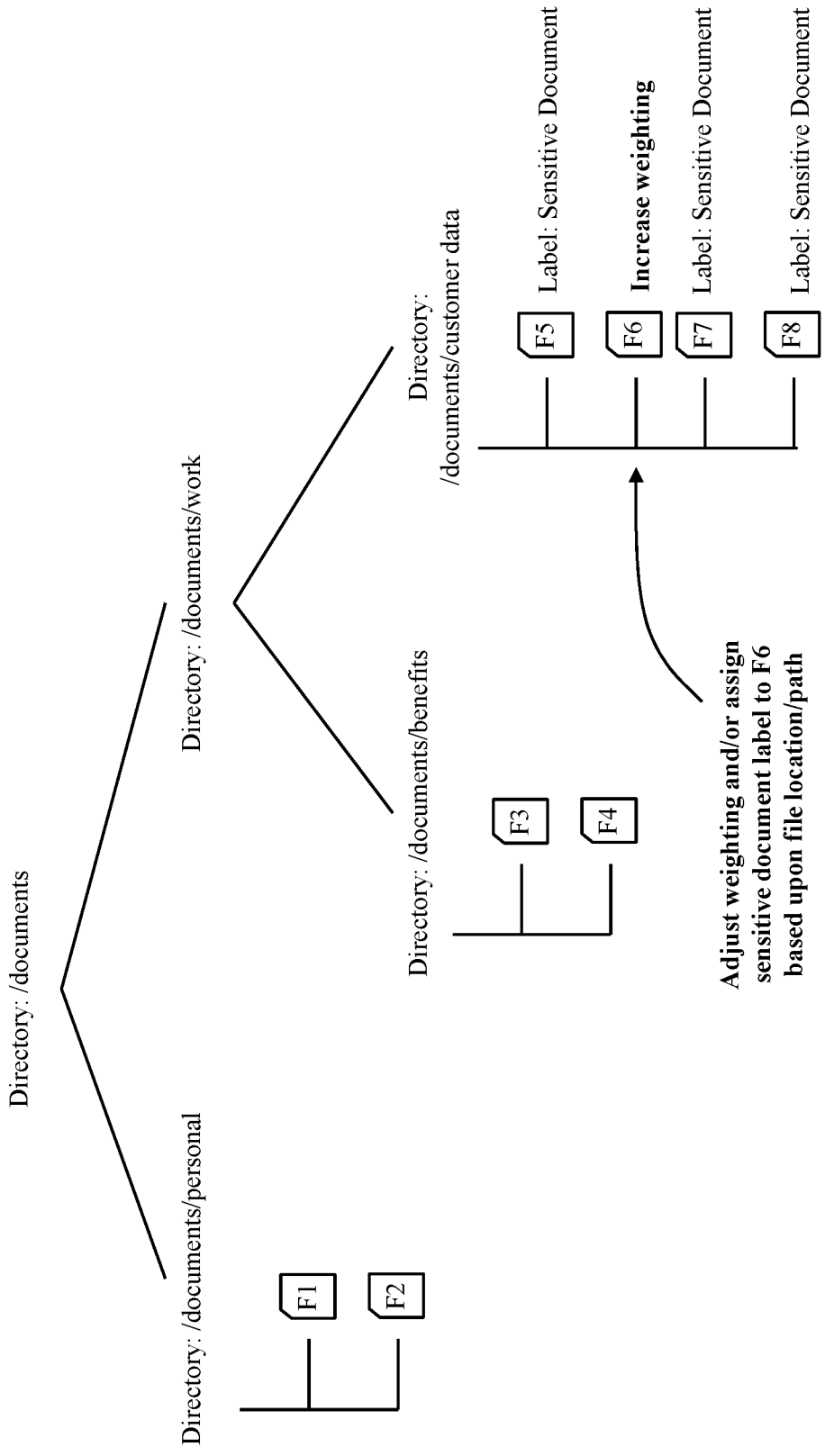

FIGS. 10A-B illustrates an example scenario that benefits from this type of processing, where weights can be configured based upon a file path or file location for a document. FIG. 10A shows an example directory tree showing numerous directories that contain files. Here, there is a directory that contains numerous files that are labelled as being sensitive document, i.e., the directory having the pathname "/documents/customer_data" that includes files F5, F7, and F8 that have been labelled as being sensitive documents.

However, this directory also contains a file F6 that does not carry the sensitive document label. In this situation, it can be predicted that since the other files F5, F7, and F8 in this directory/path are considered sensitive, then even though file F6 is not expressly labelled as being sensitive, the system should treat file F6 as if it is a sensitive document. Thereafter, as shown in FIG. 10B, even file F6 was not previously labelled as being sensitive, the system will nonetheless automatically apply the sensitive document label to file F6, or would otherwise apply a weighting to interactions involving F6 as if F6 is sensitive.

Figure 11:
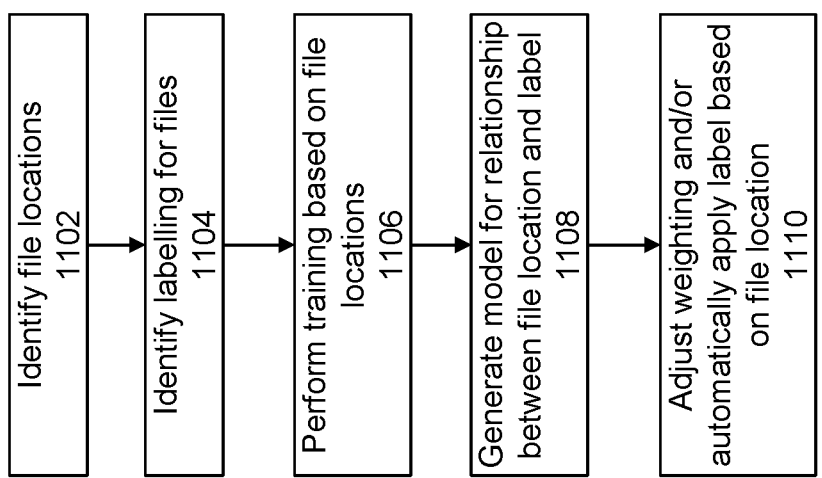
FIG. 11 shows a flowchart of an approach to implement processing based upon a file location.

FIG. 11 shows a flowchart of an approach to implement this type of processing based upon a file location, where the approach will consider the sensitivity of co-located files to determine whether any given file should also be considered sensitive. At 1102, one or more file locations are identified. It is noted that this action may identify either a file location or a file pathname. At 1104, labelling is identified for the files within the various file locations. The labels may include information at a very high level of granularity such as a simple label of "sensitive" or "not sensitive". The label may also provide a more nuanced basis for an indication of sensitivity, with a more granular indication of sensitivity such as a numeric sensitivity value.

At step 1106, a training algorithm may be applied to the file locations and/or file pathnames. The training is applied to create, at 1108, a model of the relationship between file locations and sensitivity labels for files. Thereafter, at 1110, as files and/or file interactions are processed in the system, weightings and/or labelling can be automatically applied based at least in part upon the file locations.

Figure 12A:
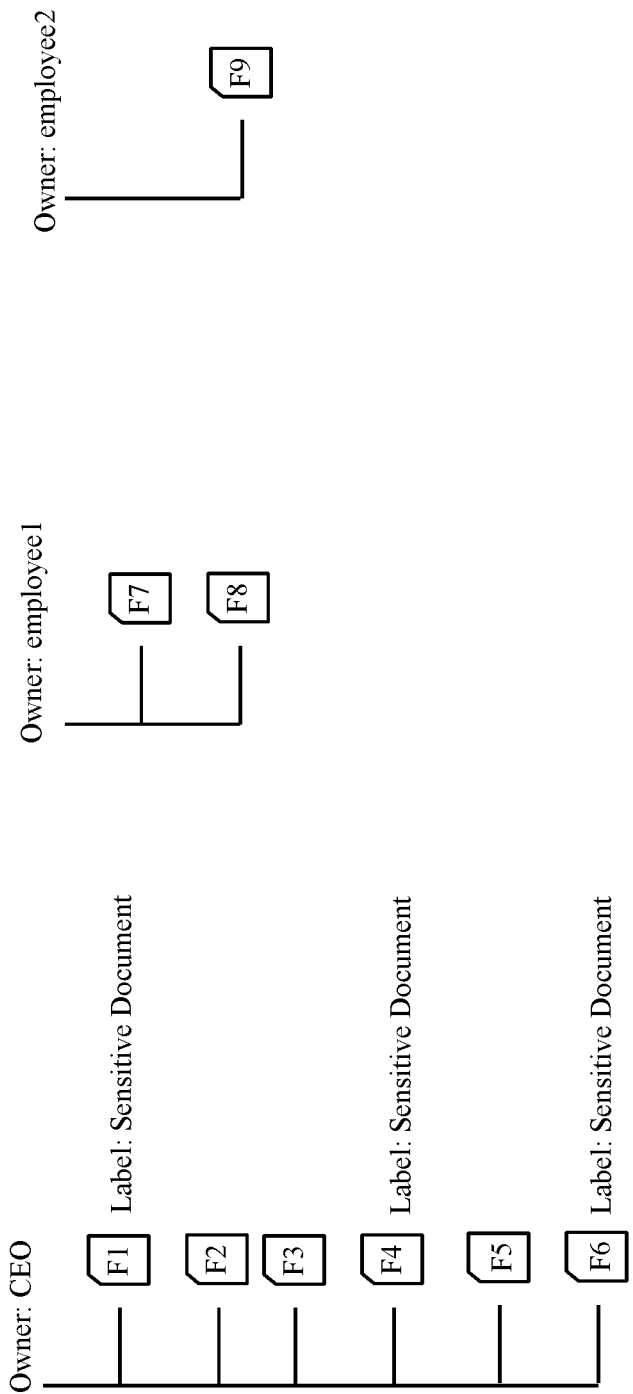
FIGS. 12A, 12B, 13, 14, and 15 illustrate approaches to implement weighting.
Figure 12B:
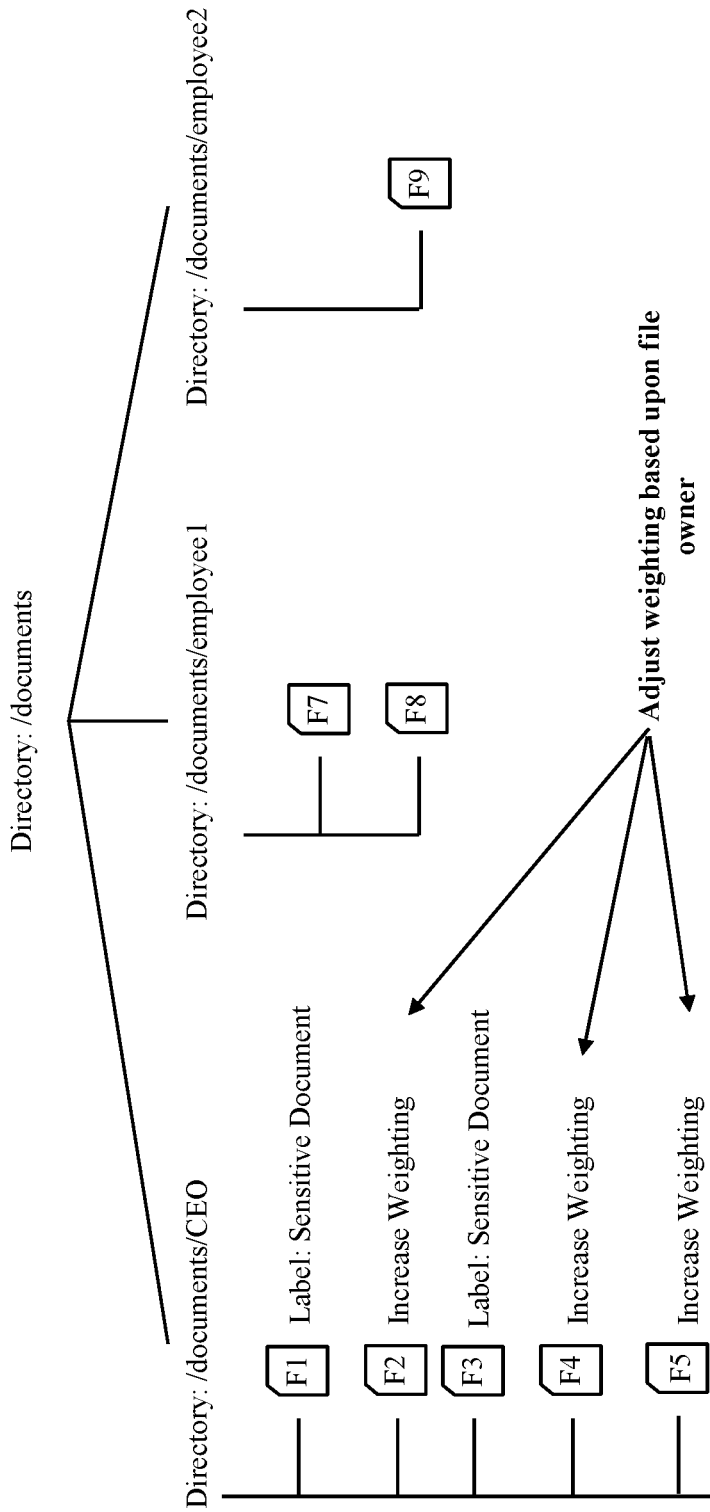

It is noted that any suitable attribute and/or criteria may be used to adjust the weight for a given file or file interaction. As another example, the ownership of a file may also be used as a basis for adjusting weightings. To explain, consider the example scenario of FIG. 12A files F1-6 are documents owned (or created, edited, modified, etc.) by a company CEO, while Files F7-9 are owned by ordinary company employees. In this scenario, it can be seen that several of the files owned by the CEO are already labelled as being sensitive documents, whereas the documents owned by the ordinary employees are not considered to be sensitive. Given these circumstances, it is likely that a document owned by the CEO may be deemed appropriate for treatment as being a sensitive document. Therefore, as shown in FIG. 12B, the files F2, F4, and F5—even though not currently labelled as sensitive documents—may nonetheless be treated as sensitive document when weightings are applied (and/or sensitivity labels are automatically applied to the files).

Figure 13:
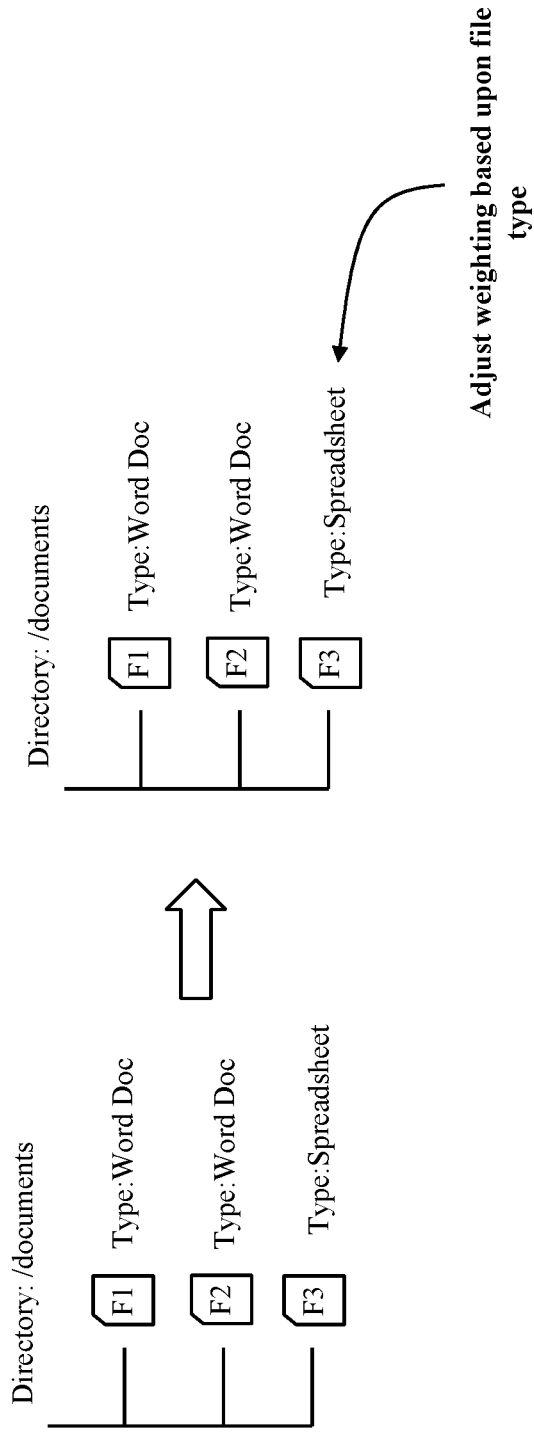

As yet another example, the document type of a file may be used as a basis for adjusting weightings. Certain types of files may tend to have greater amounts of confidential or sensitive information as compared to other types of files. For example, it is likely that engineering/product design documents or financial spreadsheets may be more likely to have confidential or sensitive content as compared to ordinary word processing documents. This situation is illustrated in FIG. 13, where files F1 and F2 are ordinary word processing documents and file F3 is a financial spreadsheet. In this scenario, since the document type for file F3 is indicative of this document as being more sensitive, then the weighting for a user interaction with file F3 will tend to have the weighting of the interaction increased, particularly in comparison to interactions involving the other files F1 and F2.

Figure 14:
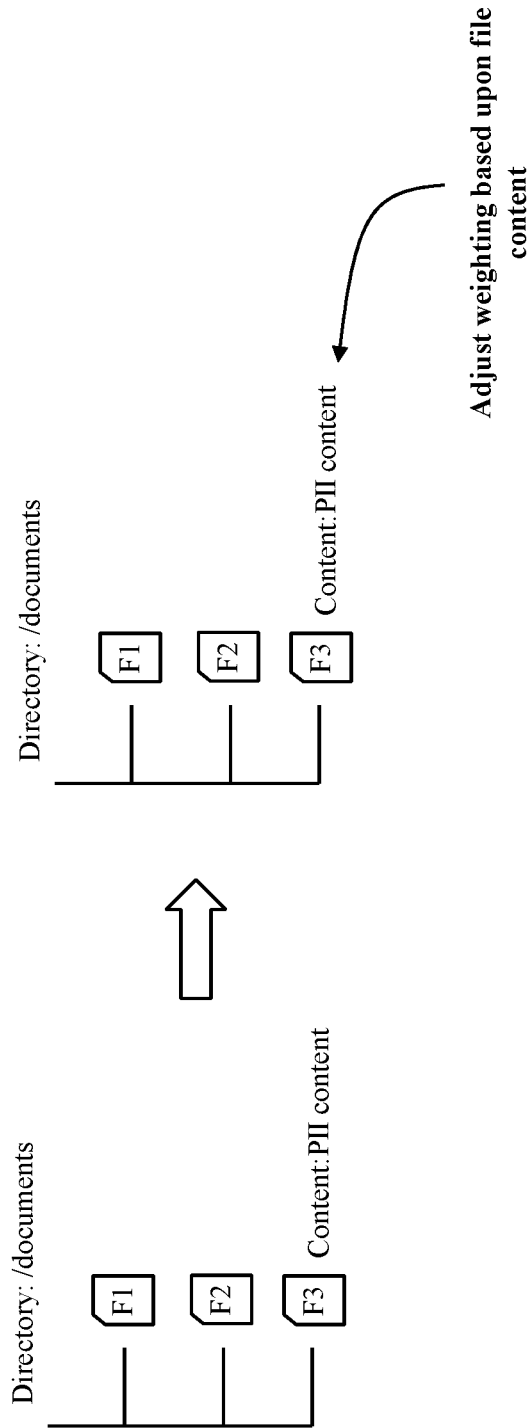

Another basis for adjusting weightings is premised upon the content within a document. If a file is known to include confidential or sensitive information, then that file should have an increased weighting as compared to files that do not have such confidential or sensitive content. For example, a system may choose to treat a file that includes items of PII (personally identifiable information) as being more sensitive than ordinary document which do not include such sensitive information. This situation is illustrated in FIG. 14, where files F1 and F2 are ordinary documents but file F3 includes PII content. In this scenario, since file F3 includes PII content, then the weighting for a user interaction with file F3 will tend to be increased, particularly in comparison to interactions involving the other files F1 and F2.

Figure 15:
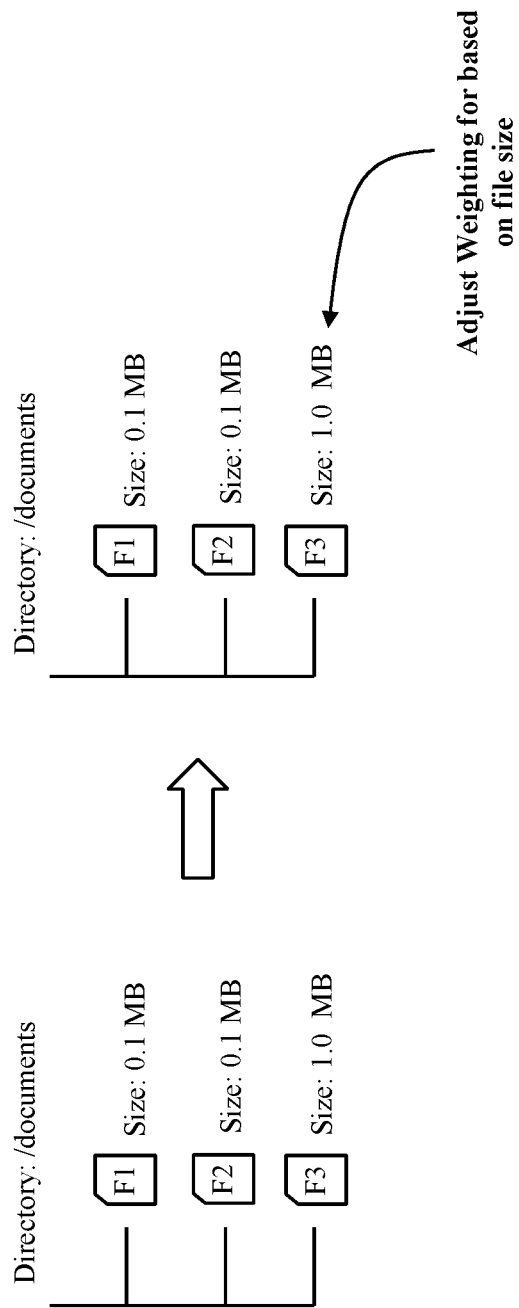

Yet another possible basis for adjusting weightings is premised upon the size of a document, with greater weighting applied to downloads of larger documents. For example, the weight assigned to drive_download of a one megabyte pdf file might be greater than the weight given to a download of a much smaller file. This situation is illustrated in FIG. 15, where files F1 and F2 are smaller documents having a size of 0.1 MB, but file F3 is a much larger file having a file size of 1.0 MB. In this scenario, since file F3 is a much larger file, then the weighting for a user interaction with file F3 will tend to have the weighting of the interaction increased, particularly in comparison to interactions involving the other files F1 and F2.

For each of the factors considered for weighting, or a combination of any number of the factors, a function may be assigned to adjust the weights based upon the particular factor(s) or criteria. For example, consider again the concept of adjusting weights based upon a file size. A non-linear function may be applied to adjust the interaction weights, where the weights may be adjusted with large increases at proportionally smaller increases in file size, but once the file sizes reach a certain size level, then the weight increases will be much smaller until it eventually levels off. For example, weights may increase/differ dramatically between a first file having a 0.1 MB size and a second file having a 1.0 MB size. However, the weight of a first file at a 1 GB size may not differ much (or may even be the same) as the weight of a second file at a 5 GB size. Any of the functions may be configured manually, or adjusted using a machine learning process.

The above-described approach of using vectors for both a comparison time period and an anomaly time period could also be used in conjunction with additional processing that only involves the use of the vector for the anomaly time period.

Figure 16:
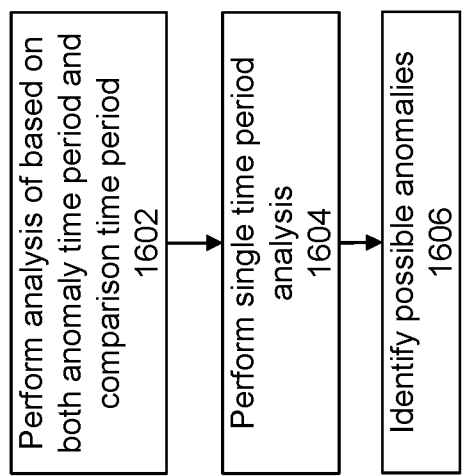
FIG. 16 shows a flowchart of an approach to perform multiple stages of analysis according to some embodiments of the invention.

FIG. 16 shows a flowchart of this approach according to some embodiments of the invention. At 1602, analysis is performed as described above, where both the comparison time period and the anomaly time period is reviewed to generate a score that can be employed to identify any anomalous download events. With this current approach, the analysis at 1602 now becomes a first stage of a two-stage analysis for anomalies.

At 1604, a second stage analysis is performed that looks at the interactions that occur in the anomaly time period. With the analysis using just the vector for the anomaly time period, this becomes a separate step that does not rely upon a magnitude difference between the two time periods.

At 1606, the results of the multiple stages of analysis are used to identify the existence of any possible anomalies. With the current approach, both the first and second stage analyses could be used, either individually or in combination, to identify the presence of any suspicious download events. As such, the characteristics of just the anomaly time period could be used in conjunction with, or in addition to, the results of the two-time-period analysis.

Any suitable approach can be employed to analyze the data in the anomaly time period. In some embodiments, the analysis at 1604 can be premised upon the idea that normal user behavior typically involves a user accessing or downloading files from a limited number of file clusters, where the user ordinarily accesses the same files or file classifications with predictable regularity to perform the user's regular work duties. In contrast, it is less likely that the user will scan across large numbers of different files from a large number of different file clusters. Instead, this type of activity is more typical of malware or an insider threat situation that is quite different from normal user behaviors.

Therefore, the analysis of the anomaly time period can be performed by looking at the distribution of weights in the vector for the anomaly time period using an entropy function. If the analysis of the user interactions indicates that the user has obtained a large number of files from different file clusters, then this is indicative of a suspicious download situation. On the other hand, if the analysis of the user interactions indicates that the user has obtained a files from a small number of file clusters, then this is less indicative of a suspicious download situation.

Figure 17:
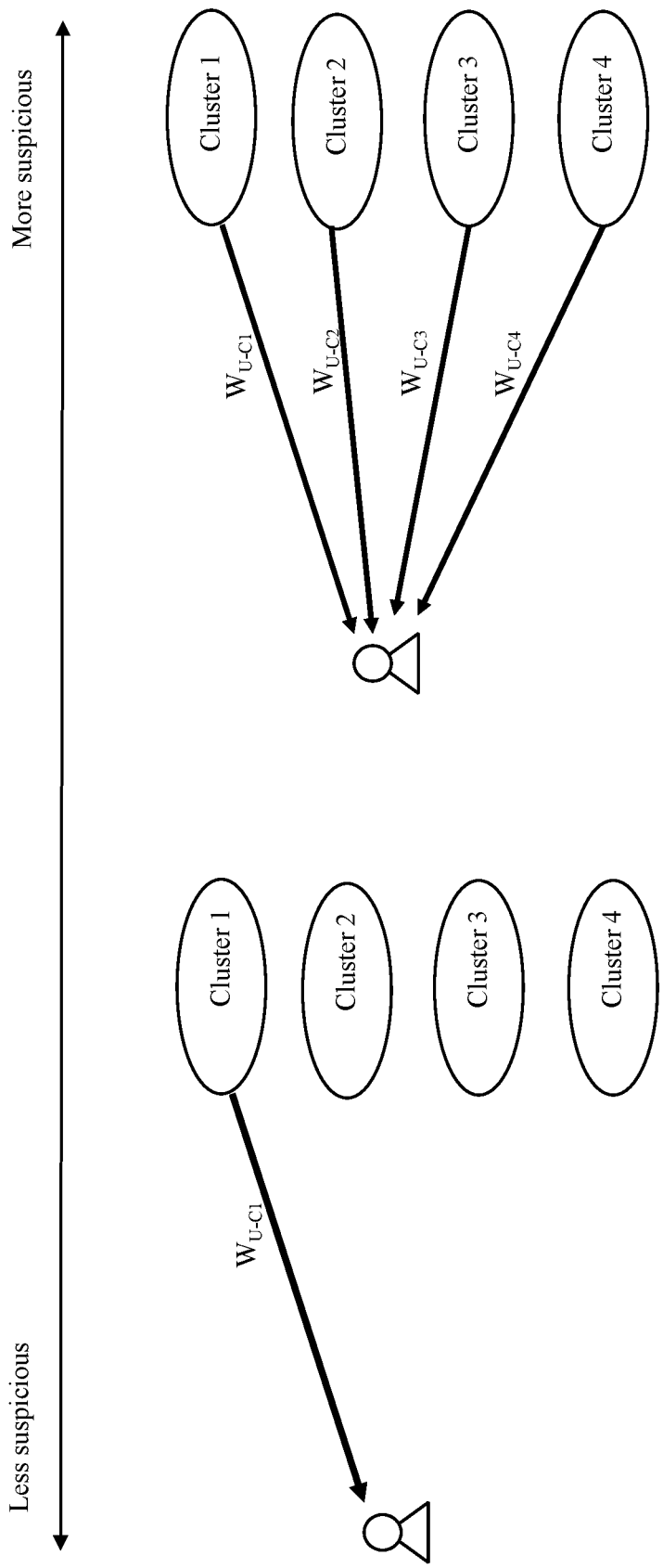
FIG. 17 provides an illustrative example of an approach to analyze the data in the anomaly time period.

FIG. 17 provides an illustrative example of this approach. Here, assume each file cluster pertains to files from a different department within a company. For example, assume that cluster 1 pertains to files from the marketing department, cluster 2 pertains to the legal department, cluster 3 pertains to the engineering department, and cluster 4 pertains to the finance department. Normal user behavior is for a given user to typically access files from a small number of file clusters, e.g., an employee of the marketing department will usually only access files from the files in cluster 1 pertaining to the marketing department, and that employee in the marketing department is less likely to download files from the engineering department, legal department, or finance department. Therefore, the usual behavior of most users is as shown on the left side of FIG. 17, where a graph of the user interaction behavior will usually only show user-to-file interactions from a limited number of file clusters. In contrast, it would be deemed to be suspicious for a user to behave in a way where that user interacts with files from a large number of file clusters. Therefore, if the analysis of the anomaly time period corresponds to a graph of the user interactions where the user access files from a large number of cluster as shown on the right-hand side of FIG. 17, this scenario would be more indicative of a suspicious download situation that would warrant an alert to an administrator.

This type of analysis could be used by itself to identify anomalous behavior. In addition, this type of analysis could be used in conjunction with the two-time-period analysis, where a combination of results from both stages could be factored together to determine whether user behavior corresponds to anomalous behavior.

Therefore, what has been described is an improved approach to implement anomaly detection, particularly for malicious downloads by insiders. User behavioral analysis is performed, where features vectors are generated for two time periods. Anomaly scoring can be performed to identify possible anomalies. In addition, weighting techniques maybe applied to facilitate improved analysis and scoring for the time periods. Moreover, an additional stage of processing may be performed to look at just the vectors for the anomaly time period.

Additional System Architecture Examples

Figure 18A:
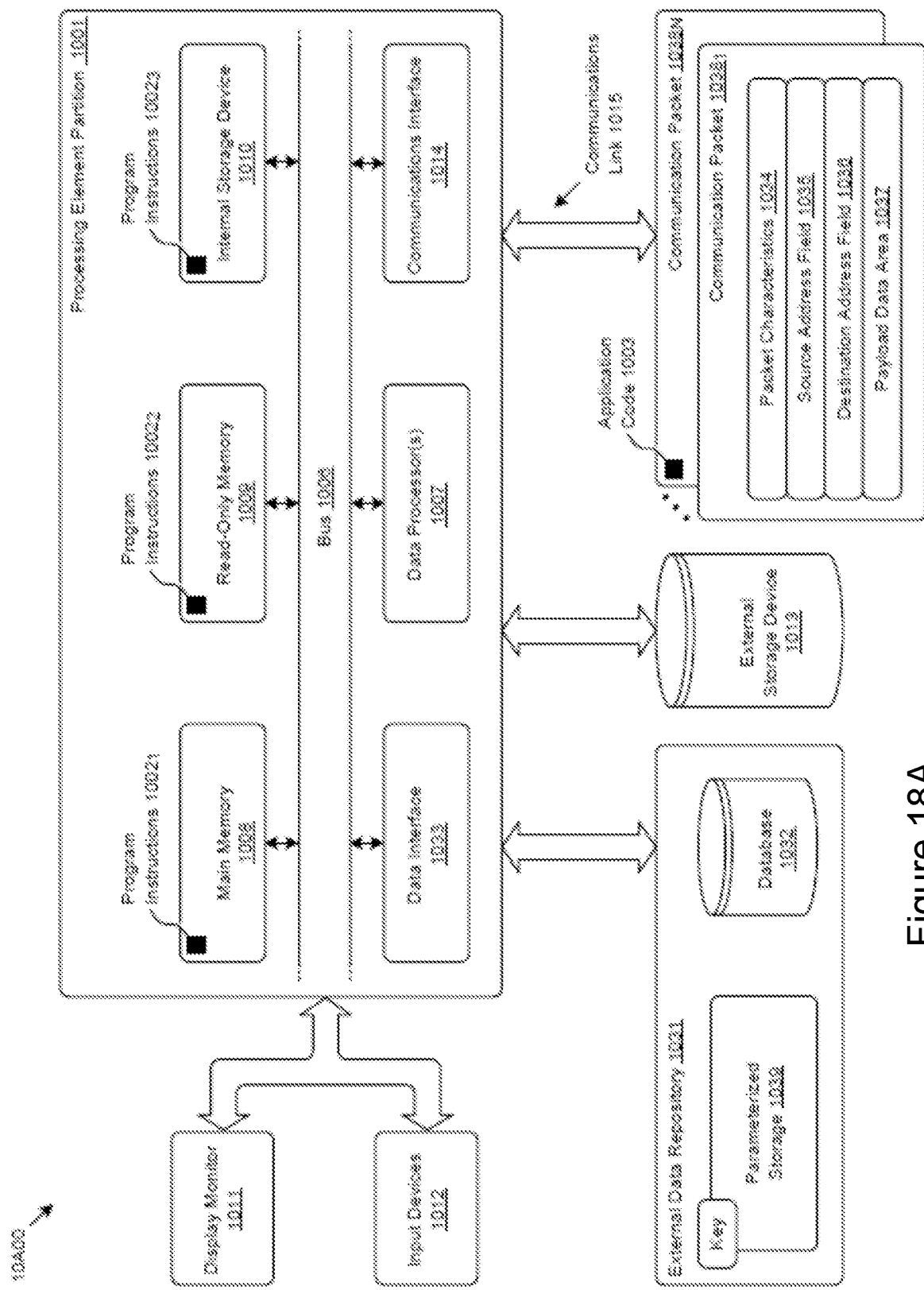
FIG. 18A and FIG. 18B depict example architectures of components suitable for implementing embodiments of the present disclosure, and/or for use in the herein-described environments.

FIG. 18A depicts a block diagram of an instance of a computer system 10A00 suitable for implementing embodiments of the present disclosure. Computer system 10A00 includes a bus 1006 or other communication mechanism for communicating information. The bus interconnects subsystems and devices such as a CPU, or a multi-core CPU (e.g., processor 1007), a system memory (e.g., main memory 1008, or an area of random access memory RAM), a non-volatile storage device or area (e.g., ROM 1009), an internal or external storage device 1010 (e.g., magnetic or optical), a data interface 1033, a communications interface 1014 (e.g., PHY, MAC, Ethernet interface, modem, etc.). The aforementioned components are shown within processing element partition 1001, however other partitions are possible. The shown computer system 10A00 further comprises a display 1011 (e.g., CRT or LCD), various input devices 1012 (e.g., keyboard, cursor control), and an external data repository 1031.

According to an embodiment of the disclosure, computer system 10A00 performs specific operations by processor 1007 executing one or more sequences of one or more program code instructions contained in a memory. Such instructions (e.g., program instructions $1002_1$, program instructions $1002_2$, program instructions $1002_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 10A00 performs specific networking operations using one or more instances of communications interface 1014. Instances of the communications interface 1014 may comprise one or more networking ports that are configurable (e.g., pertaining to speed, protocol, physical layer characteristics, media access characteristics, etc.) and any particular instance of the communications interface 1014 or port thereto can be configured differently from any other particular instance. Portions of a communication protocol can be carried out in whole or in part by any instance of the communications interface 1014, and data (e.g., packets, data structures, bit fields, etc.) can be positioned in storage locations within communications interface 1014, or within system memory, and such data can be accessed (e.g., using random access addressing, or using direct memory access DMA, etc.) by devices such as processor 1007.

The communications link 1015 can be configured to transmit (e.g., send, receive, signal, etc.) communications packets 1038 comprising any organization of data items. The data items can comprise a payload data area 1037, a destination address 1036 (e.g., a destination IP address), a source address 1035 (e.g., a source IP address), and can include various encodings or formatting of bit fields to populate the shown packet characteristics 1034. In some cases the packet characteristics include a version identifier, a packet or payload length, a traffic class, a flow label, etc. In some cases the payload data area 1037 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1031, which in turn can be formatted into any one or more storage areas, and which can comprise parameterized storage 1039 accessible by a key (e.g., filename, table name, block address, offset address, etc.).

Execution of the sequences of instructions to practice certain embodiments of the disclosure are performed by a single instance of the computer system 10A00. According to certain embodiments of the disclosure, two or more instances of computer system 10A00 coupled by a communications link 1015 (e.g., LAN, PTSN, or wireless network) may perform the sequence of instructions required to practice embodiments of the disclosure using two or more instances of components of computer system 10A00.

The computer system 10A00 may transmit and receive messages such as data and/or instructions organized into a data structure (e.g., communications packets 1038). The data structure can include program instructions (e.g., application code 1003), communicated through communications link 1015 and communications interface 1014. Received program code may be executed by processor 1007 as it is received and/or stored in the shown storage device or in or upon any other non-volatile storage for later execution. Computer system 10A00 may communicate through a data interface 1033 to a database 1032 on an external data repository 1031. Data items in a database can be accessed using a primary key (e.g., a relational database primary key).

The processing element partition 1001 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 1007. Some embodiments include one or more special-purpose hardware components (e.g., power control, logic, sensors, transducers, etc.). A module may include one or more state machines and/or combinational logic used to implement or facilitate the performance characteristics of systems for dynamically monitoring code execution activity to identify and manage inactive code.

Various implementations of the database 1032 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of dynamically monitoring code execution activity to identify and manage inactive code). Such files or records can be brought into and/or stored in volatile or non-volatile memory.

Figure 18B:
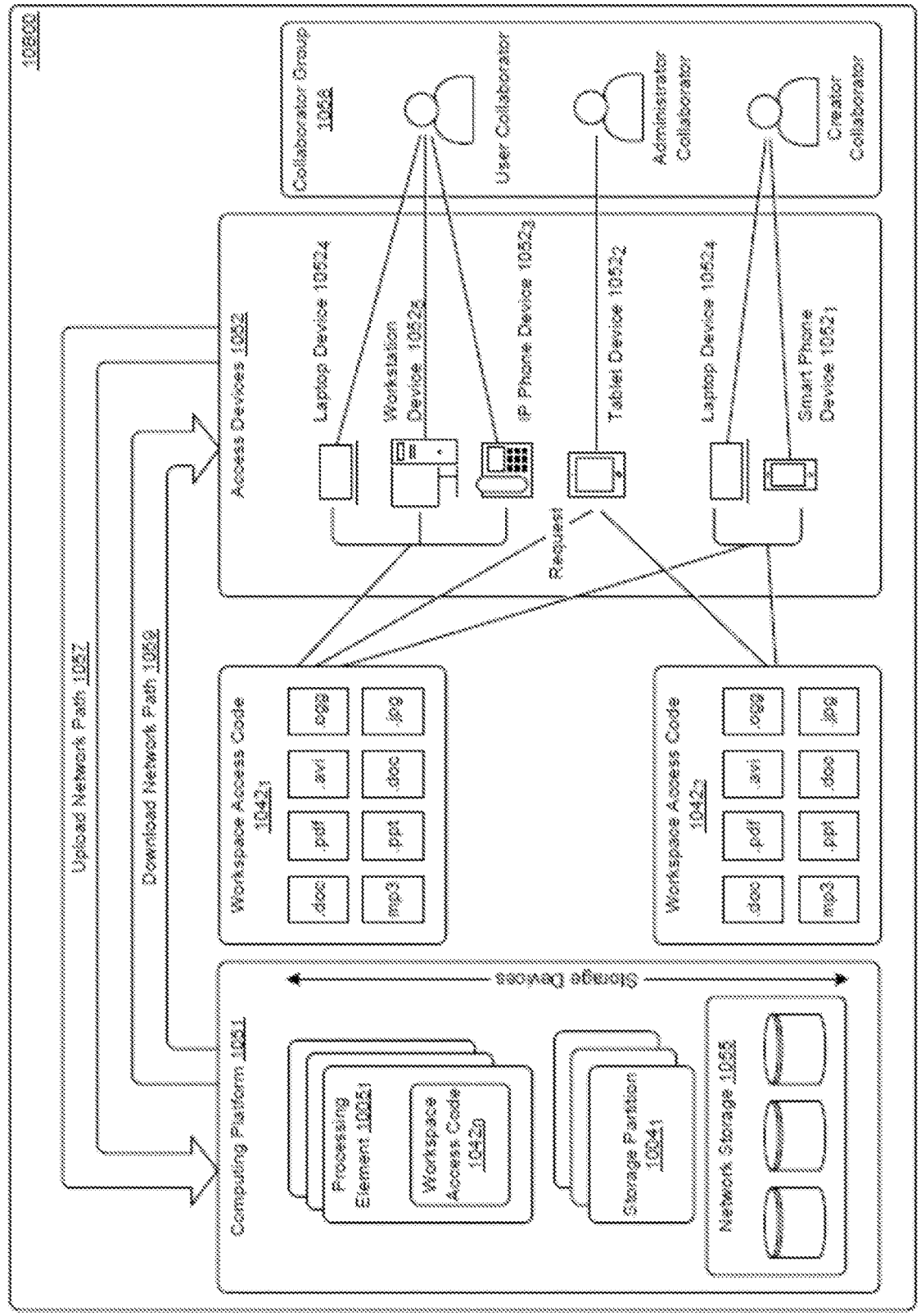

FIG. 18B depicts a block diagram of an instance of a cloud-based environment 10B00. Such a cloud-based environment supports access to workspaces through the execution of workspace view code (e.g., workspace access code $1052_1$ and workspace access code $1052_2$. Workspace access code can be executed on any of the shown user devices 1056 (e.g., laptop device $1056_4$, workstation device $1056_5$, IP phone device $1056_3$, tablet device $1056_2$, smart phone device $1056_1$, etc.), or on one or more processing elements. A group of users can form a collaborator group 1058, and a collaborator group can be comprised of any types or roles of users. For example, and as shown, a collaborator group can comprise a user collaborator, an administrator collaborator, a creator collaborator, etc. Any user can use any one or more of the user devices, and such user devices can be operated concurrently to provide multiple concurrent sessions and/or other techniques to access workspaces through the workspace access code.

A portion of workspace access code can reside in and be executed on any user device. Also, a portion of the workspace access code can reside in and be executed on any computing platform, including in a middleware setting. As shown, a portion of the workspace access code resides in and can be executed on one or more processing elements (e.g., processing element $1053_1$). The workspace access code can interface with storage devices such the shown network storage 1055. Storage of workspaces and/or any constituent files or objects, and/or any other code or scripts or data can be stored in any one or more storage partitions (e.g., storage partition $1054_1$). In some environments, a processing element includes forms of storage such as RAM and/or ROM and/or FLASH, and/or other forms of volatile and non-volatile storage.

A stored workspace can be populated via an upload (e.g., an upload from a user device to a processing element over an upload network path 1057). A stored workspace can be delivered to a particular user and/or shared with other particular users via a download (e.g., a download from a processing element to a user device over a download network path 1059).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A computer-implemented method, comprising:
collecting user to file interactions;
generating a first vector for a first time period of the user to file interactions;
generating a second vector for a second time period of the user to file interactions;
generating a score based upon analysis of the first and second vectors, wherein a weighting is applied to the user to file interactions, and the weighting applied to the user to file interactions is based at least in part upon a file location, wherein a training algorithm was applied with respect to the file location or file pathnames to train a model that is used to generate the score; and
generating an alert if the score is indicative of an anomalous download event.

2. The method of claim 1, wherein a label is identified for a file or a folder, and the weighting corresponds to the label.

3. The method of claim 2, wherein the label corresponds to at least one of "sensitive" or "not sensitive".

4. The method of claim 1, wherein the weighting is applied to increase or decrease a weight associated with a given user to file interaction.

5. The method of claim 1, wherein a relatively smaller file is weighted differently from a relatively larger file.

6. The method of claim 1, wherein a non-linear function is applied to adjust the weighting.

7. A non-transitory computer readable medium having stored thereon a sequence of instructions which, which when executed by a processor, causes the processor to perform a set of acts, the set of acts comprising:
collecting user to file interactions;
generating a first vector for a first time period of the user to file interactions;
generating a second vector for a second time period of the user to file interactions;
generating a score based upon analysis of the first and second vectors, wherein a weighting is applied to the user to file interactions, and the weighting applied to the user to file interactions is based at least in part upon a file location, wherein a training algorithm was applied with respect to the file location or file pathnames to train a model that is used to generate the score; and
generating an alert if the score is indicative of an anomalous download event.

8. The non-transitory computer readable medium of claim 7, wherein a label is identified for a file or a folder, and the weighting corresponds to the label.

9. The non-transitory computer readable medium of claim 8, wherein the label corresponds to at least one of "sensitive" or "not sensitive".

10. The non-transitory computer readable medium of claim 7, wherein the weighting is applied to increase or decrease a weight associated with a given user to file interaction.

11. The non-transitory computer readable medium of claim 7, wherein a relatively smaller file is weighted differently from a relatively larger file.

12. The non-transitory computer readable medium of claim 7, wherein a non-linear function is applied to adjust the weighting.

13. A computing system comprising:
a memory to hold a set of instructions;
a computer processor to execute the set of instructions, which when executed cause the computer processor to perform a set of acts, the set of acts comprising: collecting user to file interactions; generating a first vector for a first time period of the user to file interactions; generating a second vector for a second time period of the user to file interactions; generating a score based upon analysis of the first and second vectors, wherein a weighting is applied to the user to file interactions, and the weighting applied to the user to file interactions is based at least in part upon a file location, wherein a training algorithm was applied with respect to the file location or file pathnames to train a model that is used to generate the score; and generating an alert if the score is indicative of an anomalous download event.

14. The system of claim 13, wherein a label is identified for a file or a folder, and the weighting corresponds to the label.

15. The system of claim 14, wherein the label corresponds to at least one of "sensitive" or "not sensitive".

16. The system of claim 13, wherein the weighting is applied to increase or decrease a weight associated with a given user to file interaction.

17. The system of claim 13, wherein a relatively smaller file is weighted differently from a relatively larger file.

* * * * *